(12) United States Patent
Shioguchi

(10) Patent No.: US 12,085,404 B2
(45) Date of Patent: Sep. 10, 2024

(54) VEHICLE SURROUNDINGS INFORMATION DISPLAYING SYSTEM AND VEHICLE SURROUNDINGS INFORMATION DISPLAYING METHOD

(71) Applicant: Faurecia Clarion Electronics Co., Ltd., Saitama (JP)

(72) Inventor: Takuma Shioguchi, Saitama (JP)

(73) Assignee: Faurecia Clarion Electronics Co., Ltd., Saitama (JP)

( * ) Notice: Subject to any disclaimer, the term of this patent is extended or adjusted under 35 U.S.C. 154(b) by 212 days.

(21) Appl. No.: 17/840,810

(22) Filed: Jun. 15, 2022

(65) Prior Publication Data
US 2022/0404163 A1 Dec. 22, 2022

(30) Foreign Application Priority Data
Jun. 22, 2021 (JP) .................................. 2021-102922

(51) Int. Cl.
*G06F 21/36* (2013.01)
*G01C 21/36* (2006.01)
(Continued)

(52) U.S. Cl.
CPC ........... *G01C 21/367* (2013.01); *G06F 3/041* (2013.01); *G06F 3/04845* (2013.01);
(Continued)

(58) Field of Classification Search
CPC ....... B60R 1/00; B60R 1/27; B60R 2300/607; B60R 2300/105; B60R 2300/301;
(Continued)

(56) References Cited

U.S. PATENT DOCUMENTS

| 8,365,074 B1 * | 1/2013 | Wagner ................. G06F 3/0488 715/702 |
| 2006/0210114 A1 * | 9/2006 | Oka ....................... G08G 1/165 382/104 |

(Continued)

FOREIGN PATENT DOCUMENTS

JP 2012-134586 A 7/2012

*Primary Examiner* — Wilson W Tsui
(74) *Attorney, Agent, or Firm* — IP Business Solutions, LLC

(57) ABSTRACT

A vehicle surroundings information displaying system comprises: a map image acquiring unit for acquiring a map image of the surroundings of a vehicle; a first display image generating unit for generating a first display image by combining the map image and a vehicle mark; a surroundings information image generating unit for generating a surroundings information image that shows surroundings information for the vehicle based on point cloud data that indicate distances from a vehicle, acquired by a distance sensor; an overhead image acquiring unit for acquiring an overhead image of the surroundings of the vehicle; a second display image generating unit for generating a second display image by combining the map image, the vehicle image, the overhead image, and the surroundings information image; and a display controlling unit for switching the image displayed on the display panel between the first display image and the second display image.

7 Claims, 20 Drawing Sheets

(51) Int. Cl.
    *G06F 3/041*     (2006.01)
    *G06F 3/04845*     (2022.01)
    *G06F 3/0488*     (2022.01)
    *G06T 11/00*     (2006.01)
    *H04N 7/18*     (2006.01)
    *H04N 23/90*     (2023.01)

(52) U.S. Cl.
    CPC ............ *G06F 3/0488* (2013.01); *G06T 11/00* (2013.01); *H04N 7/181* (2013.01); *G06F 2203/04105* (2013.01); *H04N 23/90* (2023.01)

(58) Field of Classification Search
    CPC ..... G01C 21/367; G06F 3/041; G06F 3/0488; G06T 11/00; G06V 20/58; G06V 20/56; G06V 10/16; H04N 7/181; H04N 23/90
    See application file for complete search history.

(56) References Cited

U.S. PATENT DOCUMENTS

| | | | |
|---|---|---|---|
| 2011/0175752 A1* | 7/2011 | Augst | B60R 1/00 340/905 |
| 2012/0188098 A1* | 7/2012 | Mochizuki | G08G 1/096783 340/905 |
| 2017/0158134 A1* | 6/2017 | Shigemura | G06T 3/00 |
| 2018/0330171 A1* | 11/2018 | Corcoran | G06V 20/58 |
| 2019/0331497 A1 | 10/2019 | Vora et al. | |
| 2019/0383631 A1* | 12/2019 | Bigio | G06V 20/59 |
| 2020/0070725 A1* | 3/2020 | Ding | B60W 30/0953 |

* cited by examiner

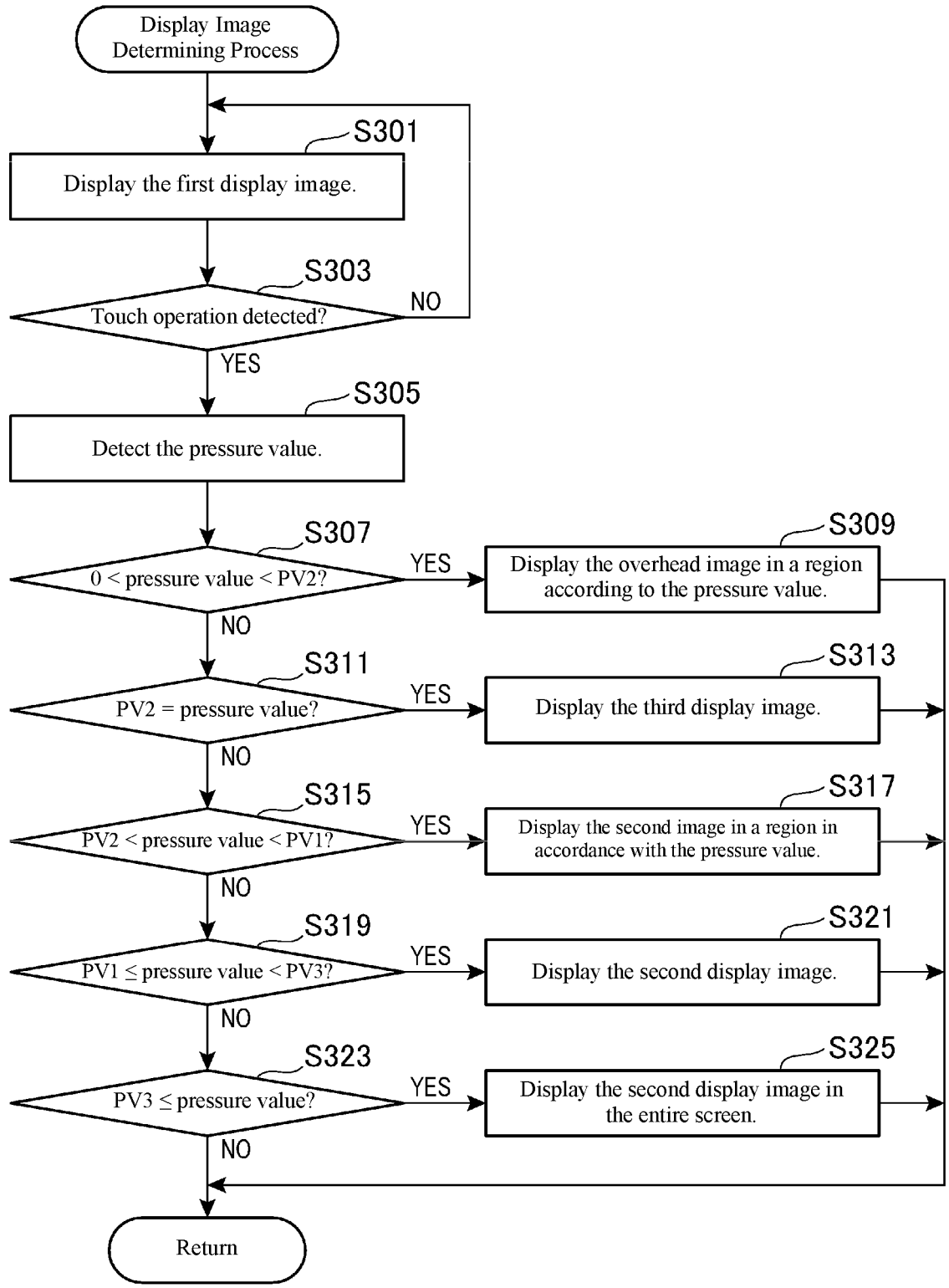

VEHICLE SURROUNDINGS INFORMATION DISPLAYING SYSTEM AND VEHICLE SURROUNDINGS INFORMATION DISPLAYING METHOD

CROSS-REFERENCE TO RELATED APPLICATIONS

The present application claims priority under 35 U.S.C. § 119 to Japanese Patent Application No. 2021-102922 filed on Jun. 22, 2021. The content of the application is incorporated herein by reference in its entirety.

BACKGROUND OF THE INVENTION

Field of the Invention

The present invention relates to a vehicle surroundings information displaying system and vehicle surroundings information displaying method.

Description of the Related Art

Conventionally, a technology has been known for displaying an image that shows information regarding the surroundings of a vehicle.

For example, Patent Document 1 describes a technology for reducing the effects of smearing, if smearing has occurred, through the effect of a high-brightness imaging subject when displaying the image of the periphery of the vehicle.

PRIOR ART REFERENCES

Patent Documents

[Patent Document 1] Japanese Unexamined Patent Application Publication 2012-134586

SUMMARY OF THE INVENTION

However, the technology described in Patent Document 1 does no more than display an overhead image (a "surround view") based on images captured by cameras, and so does no more than display surroundings information for a short distance from the vehicle.

Additionally, when it is possible to display a normal navigation image and an image showing surroundings information, being able to switch between the two would be preferred.

The object of the present invention is to provide a vehicle surroundings information displaying system and a vehicle surroundings information displaying method wherein it is possible to switch between a plurality of display images.

In order to achieve the object set forth above, the vehicle surroundings information displaying system according to the present invention comprises: a map image acquiring unit for acquiring a map image of the surroundings of a vehicle; a first display image generating unit for combining the map image and a vehicle mark that indicates the location of the vehicle, to generate a first display image to be displayed on a display; a surroundings information image generating unit for generating a surroundings information image that shows surroundings information for a vehicle, based on point cloud data that indicate distances from a vehicle, acquired by a sensor; an overhead image acquiring unit for acquiring an overhead image of the surroundings of the vehicle; a second display image generating unit for generating a second display image, to be displayed on the display panel, through combining the map image, the vehicle mark, the overhead image, which is placed surrounding the vehicle mark, and the surroundings information image, which is placed surrounding the overhead image; and a display controlling unit for receiving an operation from a user and, in response to the operation, switching the image that is displayed on the display between the first display image and the second display image.

In order to achieve the object set forth above, the vehicle surroundings information displaying method according to the present invention includes: a map image acquiring step for acquiring a map image of the surroundings of the vehicle; a first display image generating step for combining the map image and a vehicle mark that indicates the location of the vehicle, to generate a first display image to be displayed on a display; a surroundings information image generating step for generating a surroundings information image that shows surroundings information for a vehicle, based on point cloud data that indicate distances from a vehicle, acquired by a sensor; an overhead image acquiring step for acquiring an overhead image of the surroundings of the vehicle; a second display image generating step for generating a second display image, to be displayed on the display panel, through combining the map image, the vehicle mark, the overhead image, which is placed surrounding the vehicle mark, and the surroundings information image, which is placed surrounding the overhead image; and a display controlling step for receiving an operation from a user and, in response to the operation, switching the image that is displayed on the display between the first display image and the second display image.

Effects of the Invention

Given the vehicle surroundings information displaying system and vehicle surroundings information displaying method according to the present invention, a first display image is generated through combining a map image and a vehicle mark. Additionally, a second display image is generated through combining the map information, the vehicle mark, and overhead image, and a surroundings information image that shows information for the surroundings of the vehicle. Furthermore, the image that is displayed in a display is switched between the first display image and the second display image in response to an operation by the user. The user is thus able to switch between the first display image and the second display image.

BRIEF DESCRIPTION OF THE DRAWINGS

FIG. 20 is a flowchart showing an example of the display image determining process when changing the display image from a first display image to a second display image.

DETAILED DESCRIPTION OF THE INVENTION

In the below an embodiment according the present invention will be explained in reference to the drawings.

Figure 1:
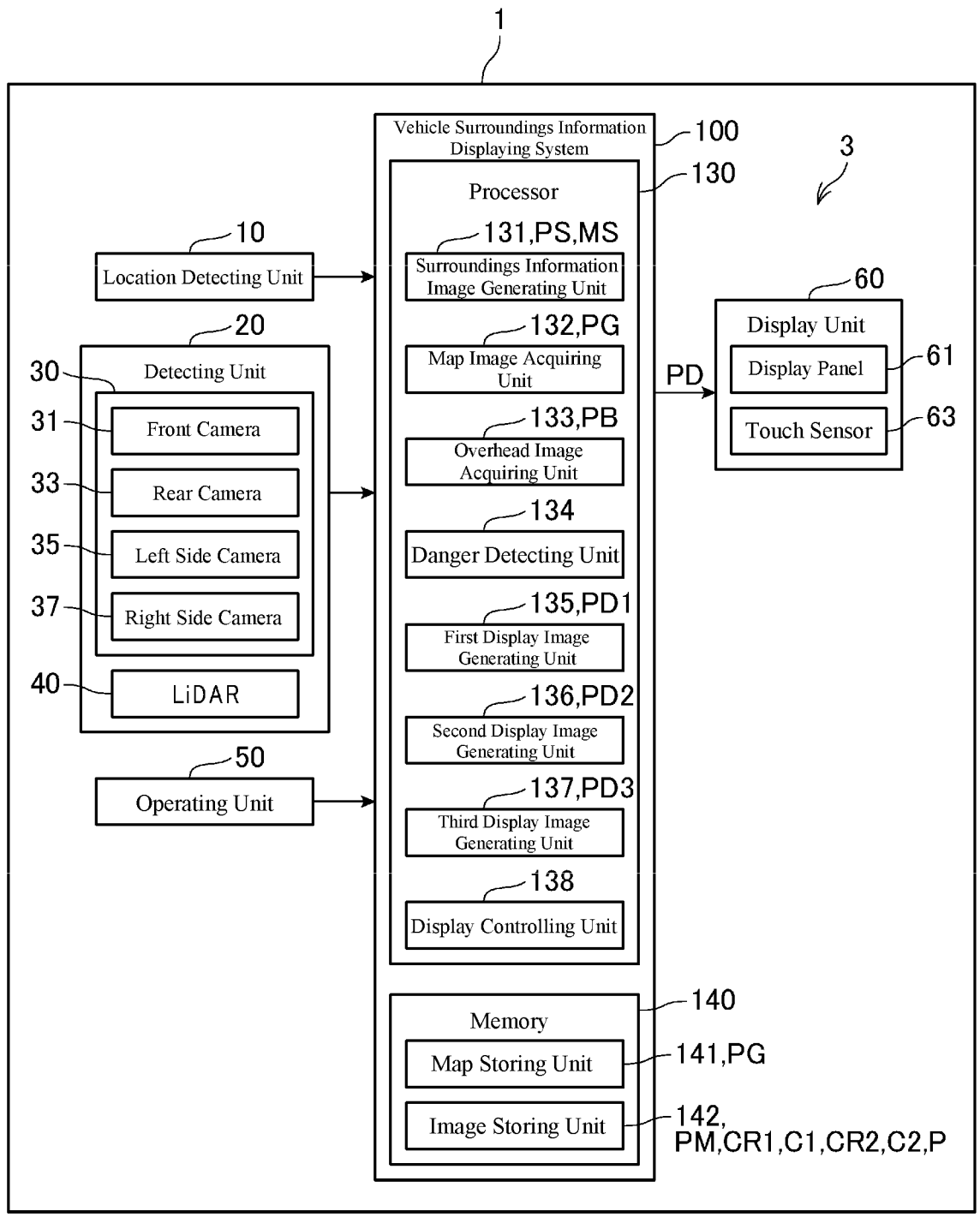
FIG. 1 is a diagram showing an example structure for an onboard system that includes the vehicle surroundings information displaying system.

FIG. 1 is a diagram showing an example structure for an onboard system 3 that includes the vehicle surroundings information displaying system 100.

The onboard system 3 is installed in a vehicle 1.

The onboard system 3 comprises a location detecting unit 10, a detecting unit 20, an operating unit 50, a display unit 60, and a vehicle surroundings information displaying system 100.

The location detecting unit 10 detects the location of the vehicle 1. The location detecting unit 10 comprises a GNSS receiver for receiving a GNSS (Global Navigation Satellite System) signal and a processor for calculating the location of the vehicle 1 based on the GNSS signal received by the GNSS receiver. The GNSS receiver and processor are omitted from the drawings. The location detecting unit 10 outputs, to the vehicle surroundings information displaying system 100, location information indicating the location of the vehicle 1.

The detecting unit 20 captures images of the surroundings of the vehicle 1 and detects point cloud data, each individual point datum of which indicates the distance from the vehicle 1 to moving bodies MS that exist in a range up to a prescribed distance from the vehicle 1. The moving body MS may be another vehicle C, a bicycle, or a pedestrian. The prescribed distance is, for example, 20 meters.

The detecting unit 20 comprises an imaging unit 30 and a distance sensor 40.

The imaging unit 30 captures images of the surroundings of the vehicle 1. The imaging unit 30 is equipped with a front camera 31 for imaging forward of the vehicle 1, a rear camera 33 for imaging rearward of the vehicle 1, a left side camera 35 for imaging toward the left side of the vehicle 1, and a right side camera 37 for imaging toward the right side of the vehicle 1.

These cameras are each equipped with image sensors such as, for example, CCDs (Charge-Coupled Devices) or CMOS (Complementary Metal-Oxide-Semiconductor) sensors, or the like, and with data processing circuits for generating captured images from the image sensors.

In the imaging unit 30, the viewing angles of each of the cameras facing in the four directions (that is, toward the front, toward the rear, toward the left side, and toward the right side) are adjusted so as to enable imaging in a range of 360°, centered on the vehicle 1, through the cameras that are facing in the four directions. The front camera 31, the rear camera 33, the left side camera 35, and the right side camera 37 each carries out imaging of the respective imaging range at a prescribed frame rate, to generate captured images. The imaging unit 30 outputs the generated captured images to the vehicle surroundings information displaying system 100. The vehicle surroundings information displaying system 100 stores the inputted captured images into a memory 140.

Note that each of the individual cameras (the front camera 31, the rear camera 33, the left side camera 35, and the right side camera 37) may be structured from a single camera, or may be structured from a plurality of cameras.

The distance sensor 40 detects point cloud data indicating a distance to a moving body MS that exists in a range up to the prescribed distance from the vehicle 1. The distance sensor 40 comprises LiDARs (Light Detection and Ranging) at a plurality of locations toward the front, the rear, the left side, and the right side, for example, in the body that structures the vehicle 1, and uses electromagnetic signals to acquire point cloud data. Each individual point datum that structures the point cloud data indicates the distance to a moving body MS that exists in a range up to the prescribed distance from the vehicle 1.

While in the present embodiment the explanation will be for a case wherein a LiDAR is used for the distance sensor 40, there is no limitation thereto. The distance sensor 40 may instead be, for example, a radar or a sonar sensor.

Moreover, while in the present embodiment the explanation will be for a case wherein LiDARs are provided in a plurality of locations in the body that structures the vehicle 1, such as toward the front, the rear, the left, and the right, there is no limitation thereto. The LiDAR may be disposed on the roof of the vehicle 1 so as to acquire point cloud data for the entire periphery (that is, forward, rearward, to the left, and to the right) thereof.

The distance sensor 40 corresponds to an example of a "sensor."

The operating unit 50 receives an operation from a user that is an occupant of the vehicle 1. The user is, for example, the driver. The operating unit 50 outputs, to the vehicle surroundings information displaying system 100, an operating signal in accordance with the operation that has been received. Operations received by the operating unit 50 include, for example, an operation for instructing the image displaying process to start, an operation for ending the image displaying process, and the like.

The operating unit 50 comprises an image display ON switch, not shown, and an image display OFF switch, not shown, and when the image display ON switch is pressed, the vehicle surroundings information displaying system 100 receives an operation instructing commencement of the image displaying process. Moreover, if, during the execution of the image displaying process, the image display OFF switch is pressed, the vehicle surroundings information displaying system 100 receives an operation for ending the image displaying process.

Note that the "image displaying process" is a process by which the vehicle surroundings information displaying system 100 generates a second display image PD2 by combining, for example, a map image PG, a vehicle image PR, an overhead image PB, and a surroundings information image PS, and displays the generated second display image PD2 on a display panel 61. The second display image PD2 corresponds to an example of a display image PD. The display image PD indicates an image that is displayed on the display panel 61.

For the "image displaying process," the functional structure of the vehicle surroundings information displaying system 100 will be explained in reference to FIG. 1, and further explained in reference to FIG. 2 through FIG. 20.

In addition, the map image PG, the vehicle mark PM, the overhead image PB, the surroundings information image PS, and the second display image PD2 will be explained in reference to FIG. 2 through FIG. 10.

The display unit 60 comprises a display panel 61 and a touch sensor 63.

A liquid crystal display, an organic EL display, or the like, is used in the display panel 61. The display unit 60 displays an image such as the display image PD, or the like, on the display panel 61 based on display data inputted from the vehicle surroundings information displaying system 100.

The display panel 61 corresponds to an example of a "display."

The second display image PD2 will be explained in reference to FIG. 2 through FIG. 10.

The touch sensor 63 uses a resistance film-type sensor or an electrostatic capacitance-type sensor. The touch sensor 63 is arranged on the display surface of the display panel 61. The display unit 60 detects, through the touch sensor 63, a touch operation by the finger of the user on the display panel 61, to generate a location signal indicating the operating location of the touch operation that has been detected. That is, the display panel 61 and the touch sensor 63 structure what is known as a "touch panel."

Additionally, the touch sensor 63 is, for example, a pressure sensor of an electrostatic capacitance type. The display unit 60 detects, through the touch sensor 63, a pressure value PV due to a touch operation by the finger of the user on the display panel 61, to generate a pressure signal indicating the pressure value PV of the touch operation that has been detected.

The display unit 60 outputs the generated location signal and pressure signal to the vehicle surroundings information displaying system 100.

The vehicle surroundings information displaying system 100 is a computer comprising a processor 130, such as a CPU (Central Processing Unit), an MPU (Micro-Processing Unit), or the like, and a memory 140, such as a ROM (Read-Only Memory), a RAM (Random Access Memory), or the like.

The vehicle surroundings information displaying system 100 comprises, in addition to these devices, an interface circuit for connecting with a storage system such as an HDD (Hard Disk Drive), an SSD (Solid State Drive), or the like, sensors, and/or peripheral devices, and so forth, and an onboard network communication circuit for communicating with other onboard systems through the onboard network, and the like.

In the vehicle surroundings information displaying system 100, various types of functional structures are achieved through execution, by a processor 130, of a control program stored in the memory 140 or a storage system.

The vehicle surroundings information displaying system 100 includes, as functional units, for example, a surroundings information image generating unit 131 and a map image acquiring unit 132, an overhead image acquiring unit 133, a danger detecting unit 134, a first display image generating unit 135, a second display image generating unit 136, a third display image generating unit 137, a display controlling unit 138, a map storing unit 141, and an image storing unit 142.

Specifically, through the processor 130 executing a control program that is stored in the memory 140 or the storage system, the processor 130 functions as the surroundings information image generating unit 131, the map image acquiring unit 132, the overhead image acquiring unit 133, the danger detecting unit 134, the first display image generating unit 135, the second display image generating unit 136, the third display image generating unit 137, and the display controlling unit 138. Additionally, by executing the control program that is stored in the memory 140 or the storage system, the processor 130 causes the memory 140 to function as the map storing unit 141 and the image storing unit 142.

The map storing unit 141 stores the map image PG. The map image PG is read out from the map image acquiring unit 132.

The image storing unit 142 stores images such as the vehicle image PR, the vehicle mark PM, a first vehicle image CR1, a first vehicle mark CM1, a second vehicle image CR2, a second vehicle mark CM2, a pedestrian mark P, and the like.

The vehicle image PR indicates a vehicle 1. The vehicle image PR is positioned at the location of the vehicle 1 when the overhead image PB is displayed by the second display image generating unit 136. That is, the vehicle image PR indicates the location of the vehicle 1 in the map image PG. The vehicle 1 is, for example, a passenger vehicle that has four wheels. Given this, the vehicle image PR is an image showing a passenger vehicle that has four wheels.

The vehicle image PR corresponds to an example of a "vehicle mark."

The vehicle mark PM indicates the vehicle 1. If the overhead image PB is not displayed, the vehicle mark PM is positioned at the location of the vehicle number one in the map image PG. That is, the vehicle mark PM shows the location of the vehicle 1 in the map image PG. The vehicle mark PM is, for example, a triangle-shaped mark.

The vehicle mark PM corresponds to an example of a "vehicle mark."

The vehicle image PR will be explained further in reference to FIG. 3. The vehicle mark PM will be explained further in reference to FIG. 14.

The first vehicle image CR1 is an image of a first vehicle C1 detected by the distance sensor 40. The first vehicle image CR1 is placed at the location of the first vehicle C1 in the map image PG by the second display image generating unit 136. The first vehicle C1 is, for example, a passenger vehicle that has four wheels.

The first vehicle mark CM1 indicates a first vehicle C1 that is detected by the distance sensor 40. The first vehicle mark CM1 is placed on the road in the direction ahead of the first vehicle C1 in the map image PG by the second display image generating unit 136. The first vehicle mark CM1 is a mark of, for example, a pentagonal shape.

The second vehicle image CR2 is an image of a second vehicle C2 that is detected by the distance sensor 40. The second vehicle image CR2 is placed at the location of the second vehicle C2 in the map image PG by the second display image generating unit 136. The second vehicle C2 is, for example, a motorcycle.

The second vehicle mark CM2 indicates a second vehicle C2 that is detected by the distance sensor 40. The second vehicle mark CM2 is placed on the road in the direction ahead of the second vehicle C2 in the map image PG by the second display image generating unit 136. The second vehicle mark CM2 is a mark of, for example, a pentagonal shape.

The pedestrian mark P indicates a pedestrian detected by the distance sensor 40. The pedestrian mark P is placed at the location of a pedestrian in the map image PG by the second display image generating unit 136. The pedestrian mark P is, for example, a circle-shaped mark.

The first vehicle mark CM1 and second vehicle mark CM2 will be explained further in reference to FIG. 3 and FIG. 4.

The first vehicle image CR1 and second vehicle image CR2 will be explained further in reference to FIG. 5.

Note that in the explanation below, if there is no distinction drawn between the first vehicle C1 and the second vehicle C2, the explanation may be as "vehicle C."

The pedestrian mark P will be explained further in reference to FIG. 8.

The surroundings information image generating unit 131 acquires point cloud data from the distance sensor 40, to generate a surroundings information image PS, showing surroundings information for the vehicle 1, based on the point cloud data. Each individual point datum that structures the point cloud data indicates the distance to a moving body MS that exists in a range up to a prescribed distance from the vehicle 1. The prescribed distance is, for example, 20 m.

Additionally, the individual point data that structure the point cloud data each indicates the direction of a moving body MS. That is, the distance sensor 40 detects the direction of a moving body MS through the distance sensor 40 receiving an electromagnetic signal that is reflected by the moving body MS.

Given this, the individual point data that structure the point cloud data each indicates the location of a moving body MS in reference to the vehicle 1.

The surroundings information image PS includes the first vehicle image CR1, the first vehicle mark CM1, the second vehicle image CR2, the second vehicle mark CM2, and the pedestrian mark P.

The first vehicle image CR1 is placed at the location of the first vehicle C1 on the map image PG by the second display image generating unit 136 if the first vehicle C1 is included in a region that is shown in the map image PG that is displayed on the display panel 61.

The second vehicle image CR2 is placed at the location of the second vehicle C2 on the map image PG by the second display image generating unit 136 if the second vehicle C2 is included in a region that is shown in the map image PG that is displayed on the display panel 61.

If the first vehicle C1 is not included in a region that is shown in the map image PG that is displayed on the display panel 61 and a danger of contact with the vehicle 1 is detected by the danger detecting unit 134, the first vehicle mark CM1 is placed on the road in the direction ahead of the first vehicle C1 on the map image PG by the second display image generating unit 136.

If the second vehicle C2 is not included in a region that is shown in the map image PG that is displayed on the display panel 61 and a danger of contact with the second vehicle C2 is detected by the danger detecting unit 134, the second vehicle mark CM2 is placed on the road in the direction ahead of the second vehicle C2 on the map image PG by the second display image generating unit 136.

If a pedestrian that is detected by the distance sensor 40 is included in a region that is shown in the map image PG that is displayed on the display panel 61, the pedestrian mark P is placed at the location of the pedestrian on the map image PG.

The map image acquiring unit 132 acquires, from the location detecting unit 10, location information that indicates the location of the vehicle 1, and reads out, from the map storing unit 141, a map image PG that corresponds to the acquired location information, to acquire a map image PG for the surroundings of the vehicle 1.

While in the present embodiment, the explanation will be for a case wherein the map image acquiring unit 132 acquires a map image PG for the surroundings of the vehicle 1 through reading out, from the map storing unit 141, a map image PG corresponding to location information, there is no limitation thereto. The map image PG for the surroundings of the vehicle 1 may instead be acquired through the vehicle surroundings information displaying system 100 being connected so as to enable communication with a server system and the map image acquiring unit 132 receiving, from the server system, a map image PG corresponding to the location information. In this case, there is no need for the map storing unit 141 to store the map image PG, making it possible to simplify the structure of the vehicle surroundings information displaying system 100.

The overhead image acquiring unit 133 acquires an overhead image PB of the surroundings of the vehicle 1 through generating the overhead image PB of the surroundings of the vehicle 1 through combining together each of the captured images captured by the front camera 31, the rear camera 33, the left side camera 35, and the right side camera 37.

The danger detecting unit 134 detects the danger of contact between the moving body MS and the vehicle 1 based on point cloud data from the distance sensor 40.

For example, the danger detecting unit 134 detects the location of the moving body MS for which there is danger of contact with the vehicle 1. The danger detecting unit 134 detects, for example, an attribute of the moving body MS for which there is a danger of contact with the vehicle 1. The attribute of the moving body MS indicates, for example, whether the moving body MS is a vehicle C or a pedestrian. Moreover, the danger detecting unit 134 detects the direction, in reference to the vehicle 1, for example, where there is a danger that the moving body MS will contact the vehicle 1. Additionally, the danger detecting unit 134 detects the magnitude of the danger of contact, for example, between the moving body MS and the vehicle 1. The moving body MS may be another vehicle C, a bicycle, or a pedestrian.

The first display image generating unit 135 combines the map image PG and the vehicle mark PM that indicates the location of the vehicle 1, to generate a first display image PD1 that is to be displayed on the display panel 61.

The first display image PD1 is an image that is displayed in the "navigation screen."

The third display image generating unit 137 combines the map image PG, the vehicle image PR that indicates the location of the vehicle 1, and the overhead image PB that surrounds the vehicle image PR, to generate a third display image PD3 that is to be displayed on the display panel 61.

The second display image generating unit 136 combines the map image PG, the vehicle image PR that indicates the location of the vehicle 1, the overhead image PB that is placed surrounding the vehicle image PR, and the surroundings information image PS that is placed surrounding the overhead image PB, to generate the second display image PD2 that is to be displayed on the display panel 61.

The surroundings information image PS includes the first vehicle image CR1, the first vehicle mark CM1, the second vehicle image CR2, the second vehicle mark CM2, and the pedestrian mark P.

In the display panel 61, the region wherein the overhead image PB is displayed is a circular first region AR1 that is centered on the vehicle mark PM.

The first region AR1 will be explained further in reference to FIG. 2.

For the direction, in reference to the vehicle 1, wherein there is a danger of contact between the vehicle 1 and the moving body MS, the second display image generating unit 136 displays with emphasis the boundary line CF around the first region AR1 and the second region AR2 wherein the surroundings information image PS is displayed.

As the emphasized display of the boundary line CF, the second display image generating unit 136 displays the color of the boundary line CF in a color (for example, red, yellow, or the like), for example, that is different from that of another part of the boundary line CF, for the direction, in reference to the vehicle 1, wherein there is a danger of contact of the vehicle 1.

The boundary line CF will be explained further in reference to FIG. 2 through FIG. 10. Note that in FIG. 2 through FIG. 10 the emphasized display of the boundary line CF is indicated as a direction indicator CFE. The direction indicator CFE includes a first direction indicator CFR and a second direction indicator CFY.

While, in the present embodiment, a case will be explained wherein, as the emphasized display of the boundary line CF, the color of the boundary line CF in the direction wherein there is a danger of contact by the vehicle 1 is displayed in a color different from other parts of the boundary line CF, there is no limitation thereto. For example, the emphasized display of the boundary line CF may be through flashing the display of the boundary line CF in the direction wherein there is a danger of contact of the vehicle 1. Additionally, the direction indicator CFE may be displayed flashing, for example, as the emphasized display of the boundary line CF. In these cases, this can improve the ability of the user to recognize the direction wherein there is a danger of contact with the vehicle 1.

The display controlling unit 138 displays, on the display panel 61, the first display image PD1 that has been generated by the first display image generating unit 135, the second display image PD2 that has been generated by the second display image generating unit 136, and the third display image PD3 that has been generated by the third display image generating unit 137.

The second display image PD2 will be explained further in reference to FIG. 2 through FIG. 10.

The first display image PD1 will be explained further in reference to FIG. 14.

The third display image PD3 will be explained further in reference to FIG. 16.

While, in FIG. 2 through FIG. 10, a case will be explained wherein the display controlling unit 138 displays the second display image PD2 filling the entire display surface of the display panel 61, there is no limitation thereto. The display controlling unit 138 may instead display the second display image PD2 in a region that is a portion of the display surface of the display panel 61.

A specific example of a second display image PD2 displayed on the display panel 61 will be explained next in reference to FIG. 2 through FIG. 10.

Ordinal directions are shown in each FIG. 2 through FIG. 10. Upward in the figures corresponds to north; downward in the figures corresponds to south; to the right in the figures corresponds to the east; and to the left in the figures corresponds to west.

Figure 2:
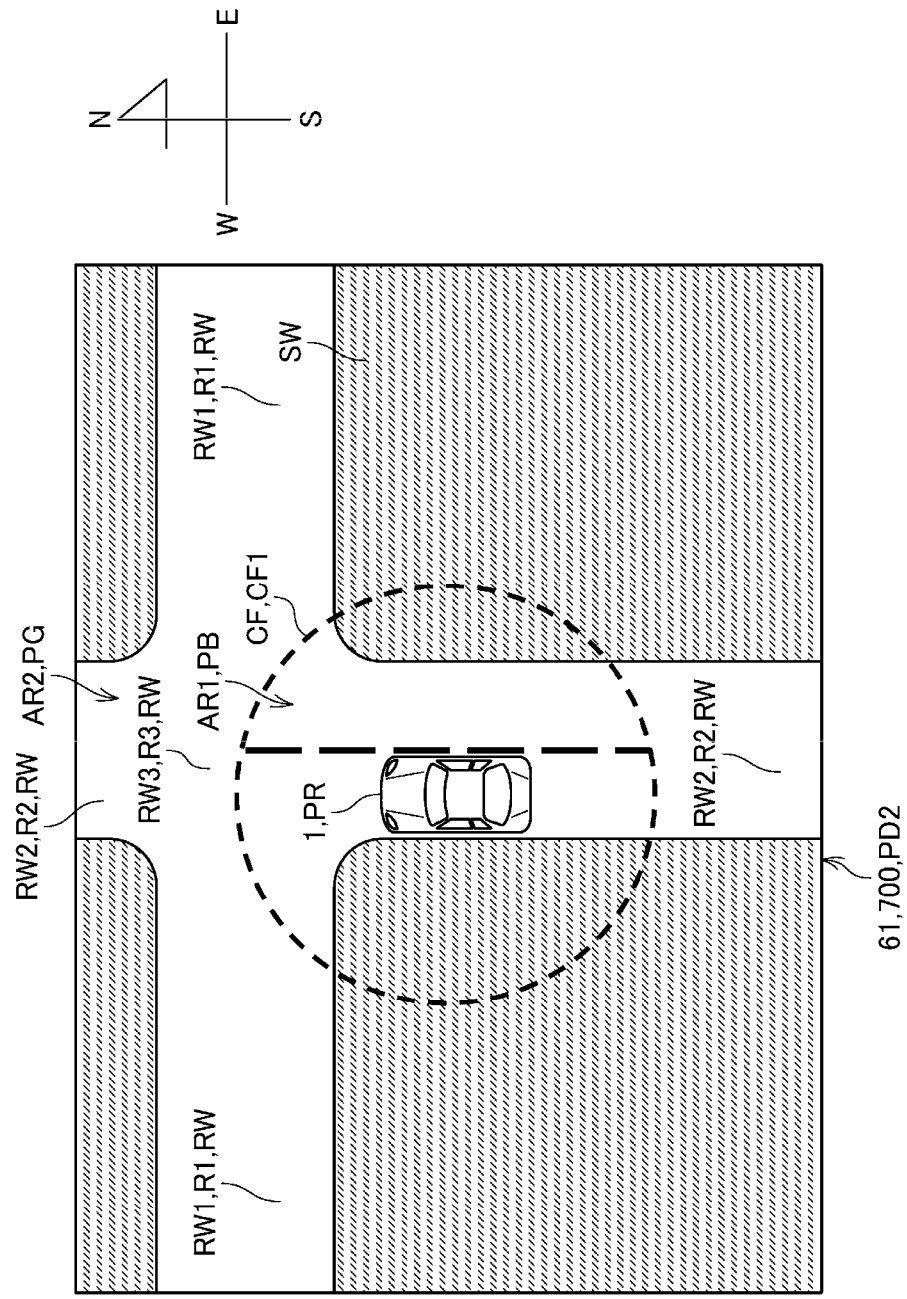
FIG. 2 is a screenshot showing an example of a first screen displaying a second display image of a first state.

FIG. 2 is a screenshot of an example of a first screen 700 that displays the second display image PD2 in a first state. The first screen 700 is displayed by the display controlling unit 138 on the display panel 61.

In the first screen 700, the vehicle image PR and the overhead image PB are displayed in a first region AR1, a map image PG is displayed in a second region AR2, and a boundary line CF is displayed at the boundary between the first region AR1 and the second region AR2.

The map image PG includes a road image RW and a sidewalk image SW. The road image RW includes a first road image RW1 showing a first road R1 that extends in the east-west direction, a second road image RW2 showing a second road R2 that extends in the north-south direction, and an intersection image RW3 showing an intersection R3 wherein the first road R1 and the second road R2 intersect. Note that, in the present embodiment, no traffic signal is located at the intersection R3.

As illustrated in FIG. 2, the vehicle 1 is traveling northbound on the second road R2, approaching the intersection R3.

In the first state, the distance sensor 40 does not detect a moving body MS. Given this, the danger detecting unit 134 detects that there is no moving body MS for which there is a danger of contact with the vehicle 1. The second display image generating unit 136 displays the boundary line CF in a first color that indicates that there is no danger of the vehicle 1 making contact with a moving body MS.

The second display image generating unit 136 displays the boundary line CF in green, for example. Green corresponds to an example of a "first color." In other words, the boundary line CF being displayed in green indicates that there is no danger of the vehicle 1 coming into contact with a moving body MS. For convenience, in FIG. 2 the boundary line CF being green is indicated by a dotted line. A boundary line CF that is displayed in green will be described as a "first boundary line CF1."

The overhead image PB is displayed in the first region AR1. The first region AR1 is a circular region that includes the vehicle 1. The overhead image PB is generated through combining the captured images captured by the front camera 31, the rear camera 33, the left side camera 35, and the right side camera 37 after projective transformation. Given this, if the overhead image PB were displayed as a rectangular image, there would be large distortion of the image at locations corresponding to the corners of the rectangular image, and an image would be generated that is discontinuous at the interface with the map image PG.

In contrast, in the present embodiment the images located corresponding to the four corners of the rectangular image generated as the overhead image PB are cut off, to generate a circular overhead image PB. The locations wherein there would be large distortion are not included in the circular overhead image PB. This enables the overhead image PB to be joined to the map image PG smoothly.

As explained in reference to FIG. 2, because the display controlling unit 138 displays the boundary line CF using the first boundary line CF1 that shows that there is no danger of the vehicle 1 contacting the moving body MS, the user can recognize visually that there is no danger of the vehicle 1 coming into contact a moving body MS.

Figure 3:
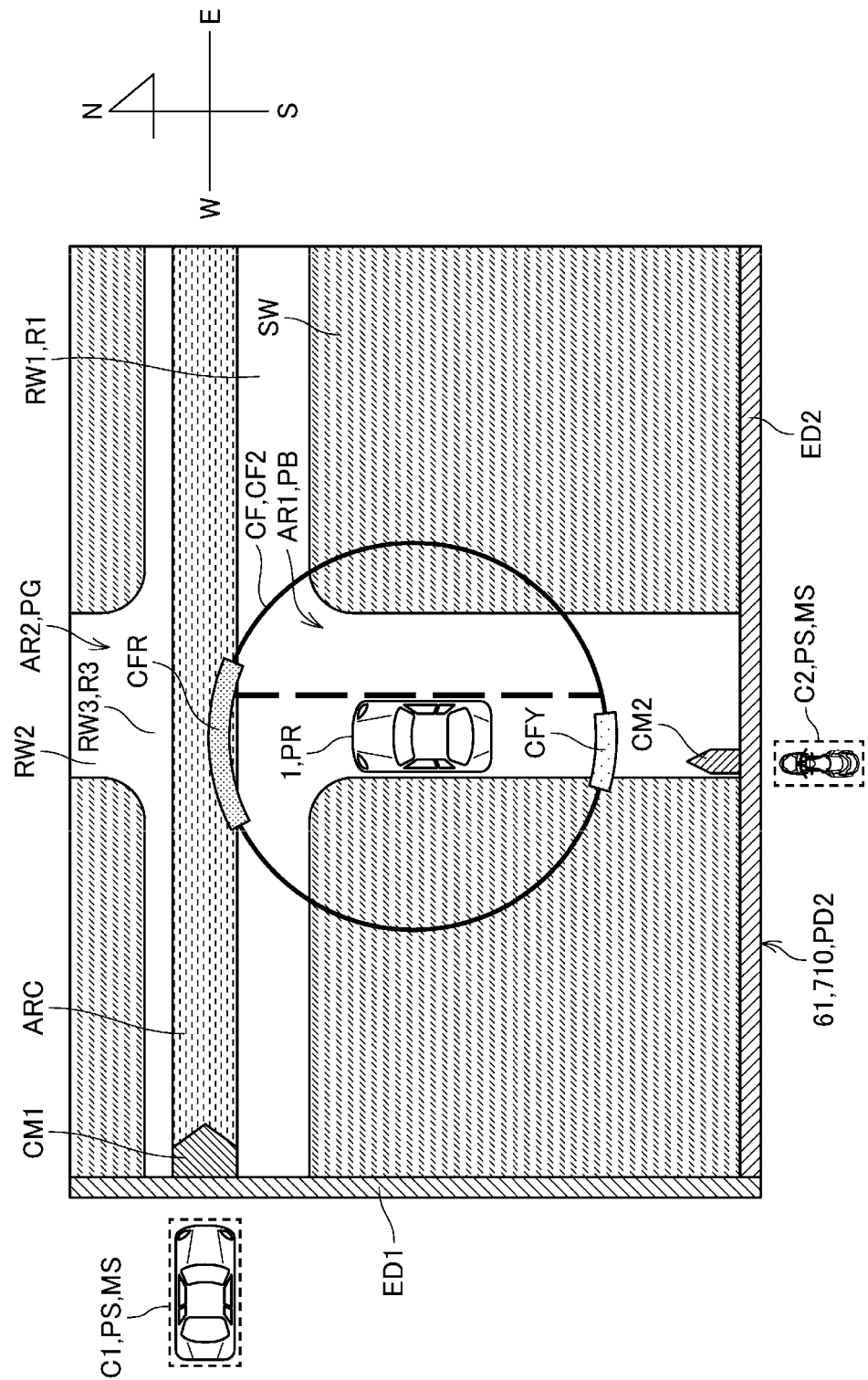
FIG. 3 is a screenshot showing an example of a second screen displaying a second display image of a second state.

FIG. 3 is a screenshot of an example of a second screen 710 that displays the second display image PD2 in a second state. The second screen 710 is displayed by the display controlling unit 138 on the display panel 61.

As with the first screen 700 depicted in FIG. 2, the vehicle image PR and the overhead image PB are displayed in the first region AR1 in the second screen 710.

In the second screen 710, the map image PG, the first vehicle mark CM1, the second vehicle mark CM2, the first danger detected indicator ED1, the second danger detected indicator ED2, and a collision danger image ARC are displayed by the display controlling unit 138 in the second region AR2.

The first vehicle mark CM1 indicates a first vehicle C1 that is traveling eastbound on the first road R1 that extends in the east-west direction, approaching the intersection R3. The first vehicle C1 corresponds to an example of a moving body MS that is detected by the distance sensor 40.

The first vehicle C1 is not included in a region that is shown in the map image PG that is displayed on the display panel 61, and a danger of contact with the vehicle 1 is detected by the danger detecting unit 134. In this case, the second display image generating unit 136 places the first vehicle mark CM1 on the road in the direction ahead of the first vehicle C1 on the map image PG. The second display image generating unit 136 places the first vehicle mark CM1, for example, at the west end (the left end in FIG. 3) of the first road image RW1.

When the danger detecting unit 134 has detected that the first vehicle C1, detected by the distance sensor 40, has a danger of contacting the vehicle 1, the display controlling unit 138 displays the first danger detected indicator ED1. The display controlling unit 138 displays the first danger detected indicator ED1 at the end portion of the display panel 61 in the direction, in reference to the vehicle 1, wherein there is a danger of contact with the vehicle 1 (the direction to the left in the present embodiment).

In the present embodiment the user is notified of the direction wherein a danger of contact of the vehicle 1 has been detected, through the display controlling unit 138 flashing the vicinity of the left edge of the display panel 61 in red at prescribed time intervals, for example, as the first danger detected indicator ED1. The prescribed time intervals are, for example, intervals of 3 seconds.

Note that the color of the first danger detected indicator ED1 is determined depending on the degree of danger of the first vehicle C1 contacting the vehicle 1. The degree of danger of the first vehicle C1 contacting the vehicle 1 is detected by the danger detecting unit 134. In the present embodiment, a high danger of the first vehicle C1 contacting the vehicle 1 is detected, so the color of the first danger detected indicator ED1 is determined to be, for example, red.

The collision danger image ARC is an image that is generated by the second display image generating unit 136, and displayed by the display controlling unit 138 when the travel speed of the first vehicle C1 is no less than a first speed. The collision danger image ARC is an image that shows the direction in which the first vehicle C1 is traveling, and the range over which there is a danger of a collision. The first speed is, for example, 70 km/h. The travel speed of the first vehicle C1 is, for example, 80 km/h.

The collision danger image ARC is displayed semi-transparently in red, for example, on the first road image RW1. The collision danger image ARC is displayed as a rectangular image that extends in the east-west direction, for example. The width of the collision danger image ARC (the short edge direction, that is, the size in the north-south direction) indicates, for example, the width of the first vehicle C1.

The second vehicle mark CM2 indicates a second vehicle C2 that is traveling northbound on the second road R2 that extends in the north-south direction, approaching the intersection R3. The second vehicle C2 corresponds to an example of a moving body MS that is detected by the distance sensor 40. The travel speed of the second vehicle C2 is less than the first speed and no less than a second speed. The second speed is, for example, 30 km/h. The travel speed of the second vehicle C2 is, for example, 40 km/h.

The second vehicle C2 is not included in a region that is shown in the map image PG that is displayed on the display panel 61, and a danger of contact with the vehicle 1 is detected by the danger detecting unit 134. In this case, the surroundings information image generating unit 131 places the second vehicle mark CM2 on the road in the direction ahead of the second vehicle C2 on the map image PG. The surroundings information image generating unit 131 places the second vehicle mark CM2, for example, at the south end (the bottom end in FIG. 3) of the second road image RW2.

When the danger detecting unit 134 has detected that the second vehicle C2, detected by the distance sensor 40, has a danger of contacting the vehicle 1, the second display image generating unit 136 generates a second danger detected indicator ED2, and the display controlling unit 138 displays the second danger detected indicator ED2. The display controlling unit 138 displays the second danger detected indicator ED2 at the end portion of the display panel 61 in the direction, in reference to the vehicle 1, wherein there is a danger of contact with the vehicle 1 (the direction toward the bottom in the present embodiment).

In the present embodiment the user is notified of the direction wherein a danger of contact of the vehicle 1 has been detected, through the display controlling unit 138 flashing the vicinity of the bottom edge of the display panel 61 in yellow at prescribed time intervals, for example, as the second danger detected indicator ED2. The prescribed time intervals are, for example, intervals of 3 seconds.

Note that the color of the second danger detected indicator ED2 is determined depending on the degree of danger of the second vehicle C2 contacting the vehicle 1. The degree of danger of the second vehicle C2 contacting the vehicle 1 is detected by the danger detecting unit 134. In the present embodiment, a moderate danger of the second vehicle C2 contacting the vehicle 1 is detected, so the color of the second danger detected indicator ED2 is determined to be yellow.

When no distinction is made between the first danger detected indicator ED1 and the second danger detected indicator ED2, the description may be of a "danger detected indicator ED" in the explanation below.

The first direction indicator CFR and second direction indicator CFY are also displayed superimposed on a portion of the boundary line CF in the second screen 710.

The first direction indicator CFR is located on the circumferential boundary line CF by the second display image generating unit 136 in the direction, in reference to the vehicle 1, in which there is a danger of the vehicle 1 contacting the first vehicle C1. The direction wherein there is a danger of the vehicle 1 contacting the first vehicle C1 is found by the danger detecting unit 134 as, for example, the range wherein the boundary line CF overlaps the collision danger image ARC.

The first direction indicator CFR is displayed by the second display image generating unit 136 as, for example, a red arc-shaped image.

Note that the color of the first direction indicator CFR is determined depending on the degree of danger of contact between the first vehicle C1 and the vehicle 1. The degree of danger of the first vehicle C1 contacting the vehicle 1 is detected by the danger detecting unit 134. In the present embodiment, a high danger of the first vehicle C1 contacting the vehicle 1 is detected, so the color of the first direction indicator CFR is determined to be red. In FIG. 3, the color of the first direction indicator CFR being red is indicated by the heavy hatching.

The second direction indicator CFY is located on the circumferential boundary line CF by the second display image generating unit 136 in the direction, in reference to the vehicle 1, in which there is a danger of the vehicle 1 contacting the second vehicle C2. The direction in which there is danger of the vehicle 1 contacting the second vehicle C2 is found, by the danger detecting unit 134 as, for example, the direction, in reference to the vehicle 1, in which the second vehicle C2 is located (which here is the direction toward the south).

The second direction indicator CFY is displayed by the second display image generating unit 136 as, for example, a yellow arc-shaped image.

Note that the color of the second direction indicator CFY is determined depending on the degree of danger of contact between the second vehicle C2 and the vehicle 1. The degree of danger of the second vehicle C2 contacting the vehicle 1 is detected by the danger detecting unit 134. In the present embodiment, a moderate danger of the second vehicle C2 contacting the vehicle 1 is detected, so the color of the second direction indicator CFY is determined to be yellow. In FIG. 3, the color of the second direction indicator CFY being yellow is indicated by the light hatching.

When no distinction is made between the first direction indicator CFR and the second direction indicator CFY, the description may be of a "direction indicator CFE" in the explanation below.

Because the first direction indicator CFR and the second direction indicator CFY are to be displayed superimposed on a portion of the boundary line CF, the color of the boundary line CF is displayed by the second display image generating unit 136 in a second color that is an inconspicuous color. The second color is, for example, gray. That is, the boundary line CF is displayed, for example, in gray by the second display image generating unit 136. A boundary line CF that is displayed in gray may be described as a "second boundary line CF2."

As explained in reference to FIG. 3, the display controlling unit 138 displays the first danger detected indicator ED1 in the vicinity of the left edge of the display panel 61, enabling the user to recognize visually that a moving body MS wherein there is a danger of contact with the vehicle 1 has been detected in the direction to the west, in reference to the vehicle 1.

Additionally, the display controlling unit 138 displays the first danger detected indicator ED1 in red, enabling the user to recognize visually that the danger of contact with the vehicle 1 is high.

As explained in reference to FIG. 3, the display controlling unit 138 displays the second danger detected indicator ED2 in the vicinity of the bottom edge of the display panel 61, enabling the user to recognize visually that a moving body MS wherein there is a danger of contact with the vehicle 1 has been detected in the direction to the south, in reference to the vehicle 1.

Additionally, the display controlling unit 138 displays the second danger detected indicator ED2 in yellow, enabling the user to recognize visually that the danger of contact with the vehicle 1 is moderate.

As explained in reference to FIG. 3, the display controlling unit 138 displays the collision danger image ARC semi-transparently in red on the first road image RW1, enabling the user to recognize visually that the travel speed of the first vehicle C1 corresponding to the collision danger image ARC is no less than the first speed.

As explained in reference to FIG. 3, the display controlling unit 138 displays the first direction indicator CFR as an arc-shaped image in the range wherein the boundary line CF overlaps the collision danger image ARC, enabling the user to recognize visually the direction in which there is a danger of contact with the vehicle 1. Moreover, the display controlling unit 138 displays the first direction indicator CFR as a red arc-shaped image, enabling visual recognition that there is a high danger of contact with the vehicle 1 in the direction indicated by the first direction indicator CFR.

As explained in reference to FIG. 3, the display controlling unit 138 displays the second direction indicator CFY as an arc-shaped image in the direction, in respect to the vehicle 1, in which the second vehicle C2 is located, enabling the user to recognize visually the direction in which there is a danger of contact with the vehicle 1. Moreover, the display controlling unit 138 displays the second direction indicator CFY as a yellow arc-shaped image, enabling visual recognition that there is a moderate danger of contact with the vehicle 1 in the direction indicated by the second direction indicator CFY.

Figure 4:
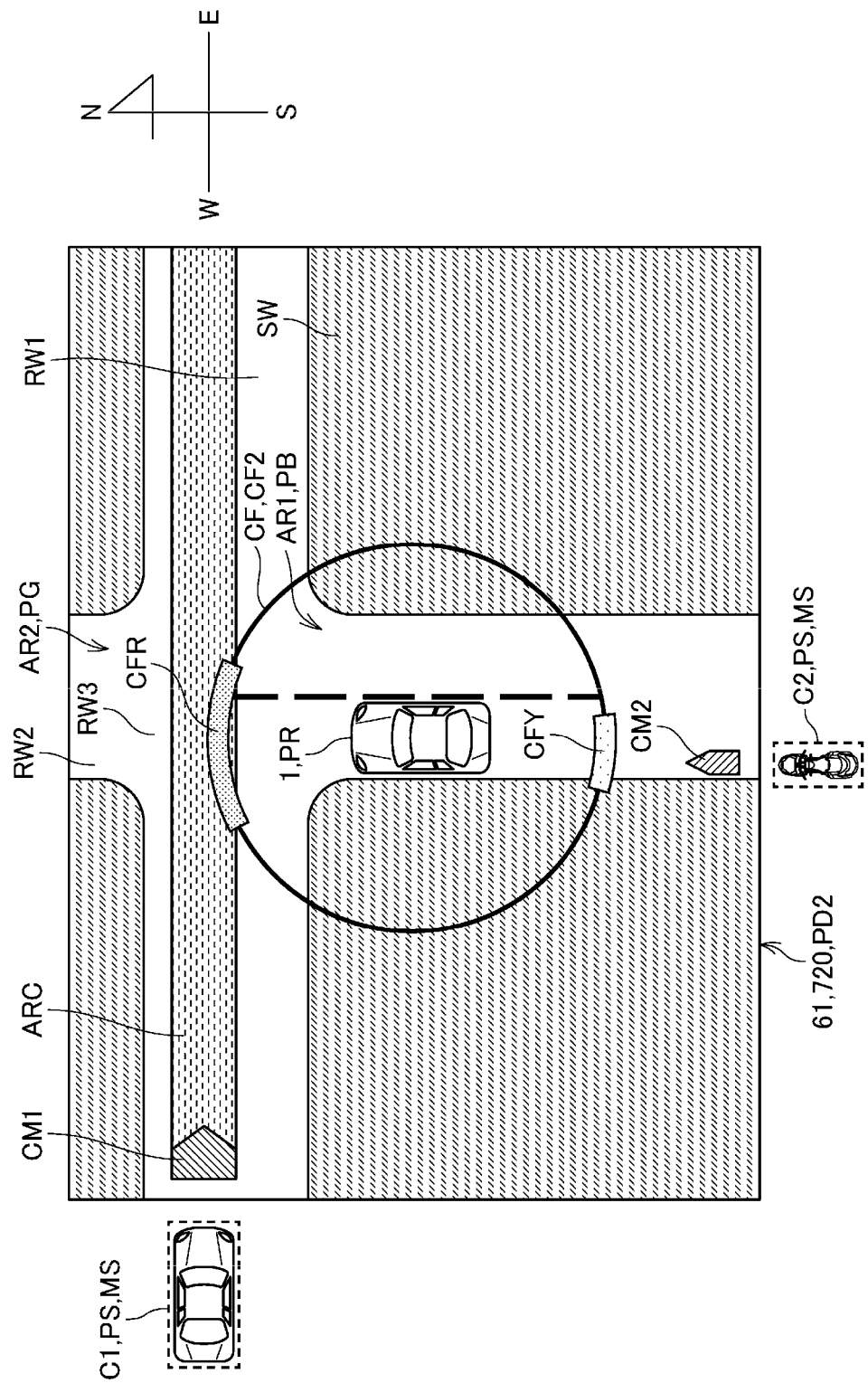
FIG. 4 is a screenshot showing an example of a third screen displaying a second display image of a third state.

FIG. 4 is a screenshot of an example of a third screen 720 that displays the second display image PD2 in a third state. The third screen 720 is displayed by the display controlling unit 138 on the display panel 61.

The difference, from the second screen 710 shown in FIG. 3, is the point that the first danger detected indicator ED1 and the second danger detected indicator ED2 are not displayed in the third screen 720. In other words, the third state is a state wherein a prescribed time interval has elapsed since the second state.

After the display controlling unit 138 has flashed each of the first danger detected indicator ED1 and the second danger detected indicator ED2 at prescribed time intervals, the display of the first danger detected indicator ED1 and the second danger detected indicator ED2 on the display panel 61 is ended. The result is that the first danger detected indicator ED1 and the second danger detected indicator ED2 are not displayed, as shown in the third screen 720 of FIG. 4.

As explained in reference to FIG. 4, after the display controlling unit 138 has flashed the first danger detected indicator ED1 and the second danger detected indicator ED2 at prescribed time intervals, the display of the first danger detected indicator ED1 and the second danger detected indicator ED2 on the display panel 61 is ended. Consequently, this can prevent the overall readability of the second display image PD2 as a whole being reduced by the focus of the user concentrating on the first danger detected indicator ED1 and the second danger detected indicator ED2 through the first danger detected indicator ED1 and the second danger detected indicator ED2 being displayed flashing.

Figure 5:
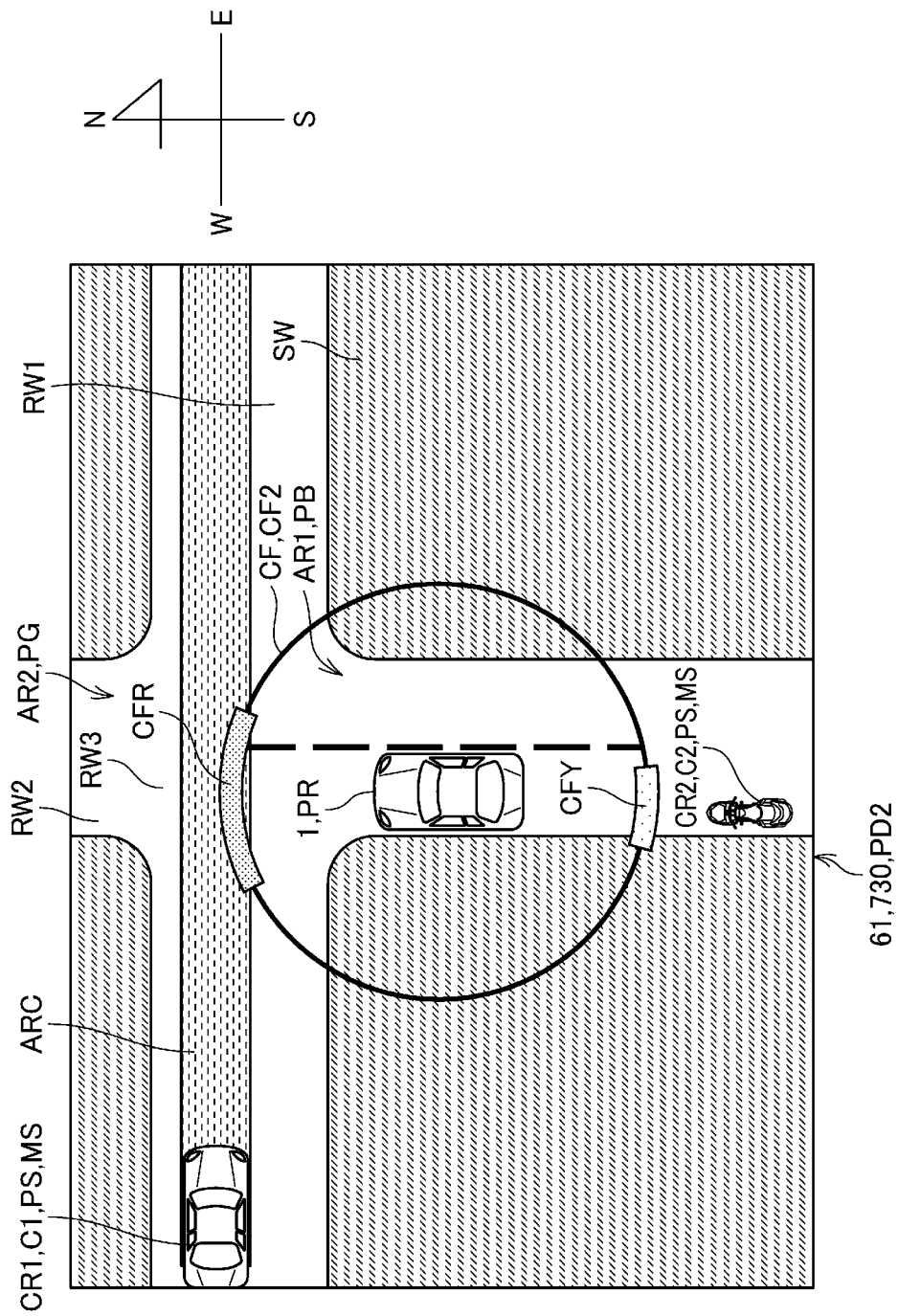
FIG. 5 is a screenshot showing an example of a fourth screen displaying a second display image of a fourth state.

FIG. 5 is a screenshot of an example of a fourth screen 730 that displays the second display image PD2 in a fourth state. The fourth screen 730 is displayed by the display controlling unit 138 on the display panel 61.

The difference from the third screen 720 is that in the fourth screen 730 the first vehicle image CR1 is displayed instead of the first vehicle mark CM1, and the second vehicle image CR2 is displayed instead of the second vehicle mark CM2.

In the fourth state, the first vehicle C1 has moved from a location that is not included in a region that is shown in the map image PG that is displayed on the display panel 61 to a location that is included in a region that is shown in the map image PG that is displayed on the display panel 61. Given this, the display controlling unit 138 displays the first vehicle image CR1 instead of the first vehicle mark CM1.

The first vehicle image CR1 is generated by the surroundings information image generating unit 131 based on the shape and size of the first vehicle C1, detected by the distance sensor 40. For example, the surroundings information image generating unit 131 generates the first vehicle image CR1 by reading out the first vehicle image CR1 from a plurality of vehicle images that are stored in the image storing unit 142, based on the shape and size of the first vehicle C1, detected by the distance sensor 40. In the present embodiment, the first vehicle C1 is a passenger vehicle with four wheels, for example, so the first vehicle image CR1 is an image showing a passenger vehicle with four wheels.

In the fourth state, the second vehicle C2 has moved from a location that is not included in a region that is shown in the map image PG that is displayed on the display panel 61 to a location that is included in a region that is shown in the map image PG that is displayed on the display panel 61. Given this, the display controlling unit 138 displays the second vehicle image CR2 instead of the second vehicle mark CM2.

The second vehicle image CR2 is generated by the surroundings information image generating unit 131 based on the shape and size of the second vehicle C2, detected by the distance sensor 40. For example, the surroundings information image generating unit 131 generates the second vehicle image CR2 by reading out the second vehicle image CR2 from a plurality of vehicle images that are stored in the image storing unit 142, based on the shape and size of the second vehicle C2, detected by the distance sensor 40. The second vehicle C2 is, for example, a motorcycle, so the second vehicle image CR2 is an image showing a motorcycle.

As explained in reference to FIG. 5, when the first vehicle C1 has moved from a location that is not included in a region that is shown in the map image PG that is displayed on the display panel 61 to a location that is included in a region that is shown in the map image PG that is displayed on the display panel 61, the display controlling unit 138 displays the first vehicle image CR1 instead of the first vehicle mark CM1. This allows the user to recognize the location of the first vehicle C1 visually. That the first vehicle C1 is a passenger vehicle with four wheels can be recognized visually through the first vehicle image CR1.

As explained in reference to FIG. 5, when the second vehicle C2 has moved from a location that is not included in a region that is shown in the map image PG that is displayed on the display panel 61 to a location that is included in a region that is shown in the map image PG that is displayed on the display panel 61, the display controlling unit 138 displays the second vehicle image CR2 instead of the second vehicle mark CM2. This allows the user to recognize the location of the second vehicle C2 visually. That the second vehicle C2 is a motorcycle can be recognized visually through the second vehicle image CR2.

Figure 6:
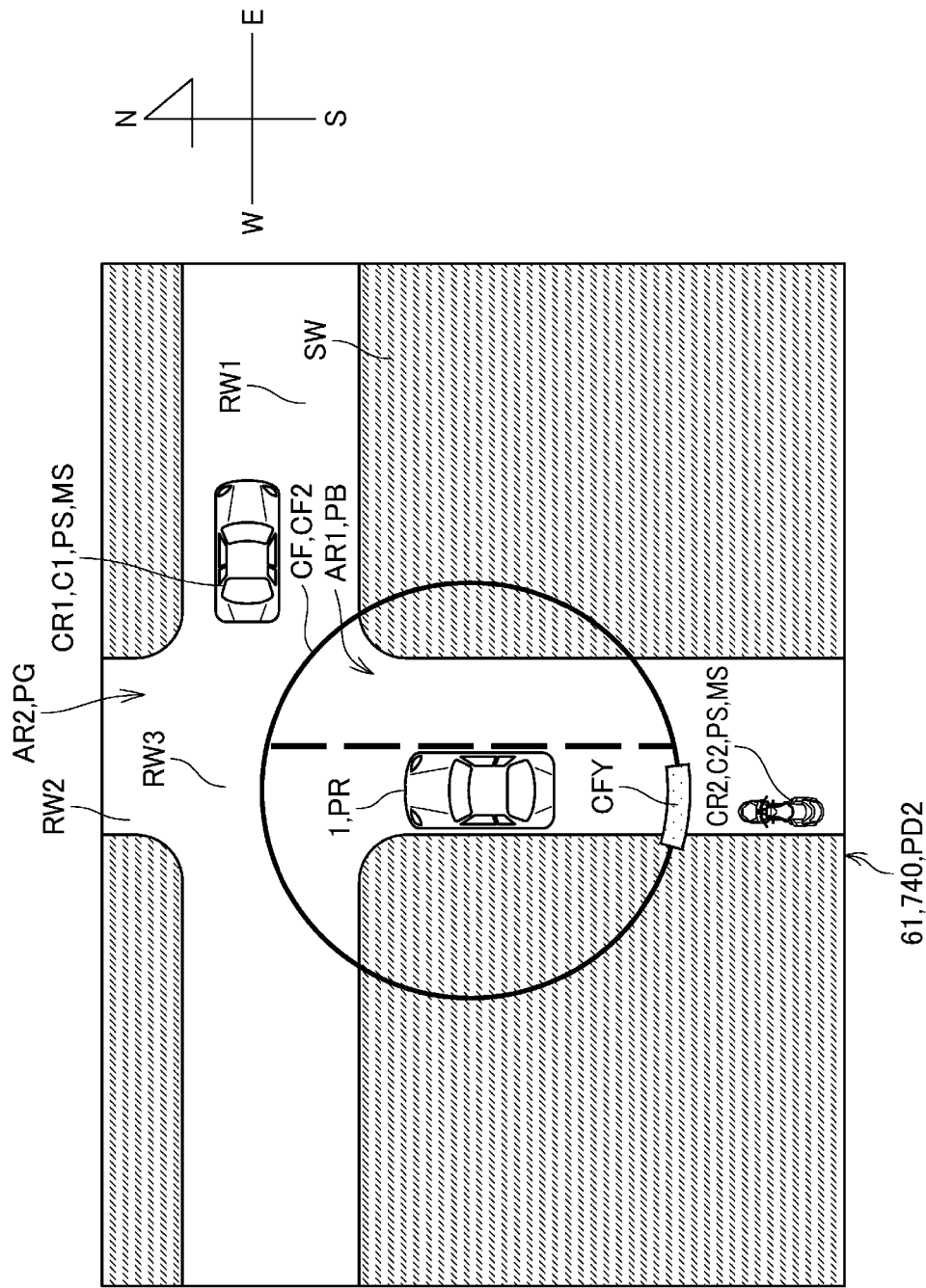
FIG. 6 is a screenshot showing an example of a fifth screen displaying a second display image of a fifth state.

FIG. 6 is a screenshot of an example of a fifth screen 740 that displays the second display image PD2 in a fifth state. The fifth screen 740 is displayed by the display controlling unit 138 on the display panel 61.

The difference from the fourth screen 730 that shows the fourth state is the point that, in the fifth screen 740 that shows the fifth state, the first vehicle C1 has passed through the intersection R3.

Because, in the fifth state, the first vehicle C1 has passed through the intersection R3, the second display image generating unit 136 places the first vehicle image CR1 to the east of the intersection image RW3.

Moreover, because the first vehicle C1 has passed through the intersection R3, the danger detecting unit 134 detects that there is no danger of the first vehicle C1 contacting the vehicle 1. Given this, the second display image generating unit 136 does not display the collision danger image ARC or the first direction indicator CFR.

As explained in reference to FIG. 6, if the first vehicle C1 has passed through the intersection R3, the collision danger image ARC and the first direction indicator CFR are not displayed. This enables the user to recognize visually that there is no danger of contact with the first vehicle C1.

Figure 7:
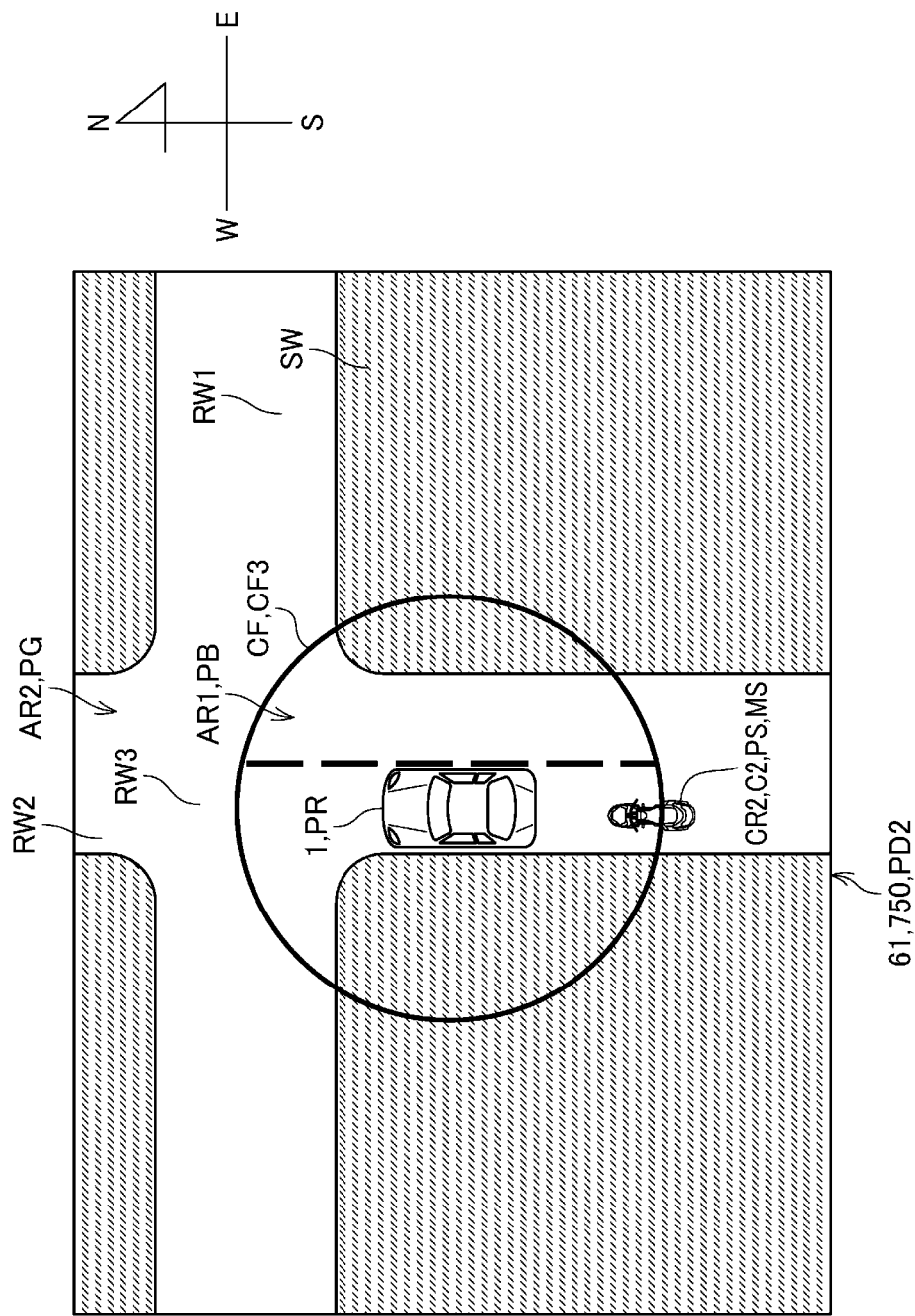
FIG. 7 is a screenshot showing an example of a sixth screen displaying a second display image of a sixth state.

FIG. 7 is a screenshot of an example of a sixth screen 750 that displays the second display image PD2 in a sixth state. The sixth screen 750 is displayed by the display controlling unit 138 on the display panel 61.

The difference, from the fifth screen 740 that shows the fifth state, is the point that, in the sixth screen 750 that shows the sixth state, a portion of the second vehicle C2 is located within the boundary line CF.

Because in the sixth state a portion of the second vehicle C2 is located within the boundary line CF, the second display image generating unit 136 does not display the second direction indicator CFY. Additionally, the danger detecting unit 134 detects that the danger of contact of the second vehicle C2 with the vehicle 1 is high. Given this, the display controlling unit 138 displays the boundary line CF with emphasis. For example, the display controlling unit 138 displays the boundary line CF in a third color that indicates that the danger of contact with the vehicle 1 is high. The third color is, for example, red.

A boundary line CF that is displayed in red may be described as a "third boundary line CF3."

As explained in reference to FIG. 7, when a portion of the second vehicle C2 is located within the boundary line CF, the boundary line CF is displayed in red. This enables the user to recognize visually that the danger of contact with the second vehicle C2 is high.

Figure 8:
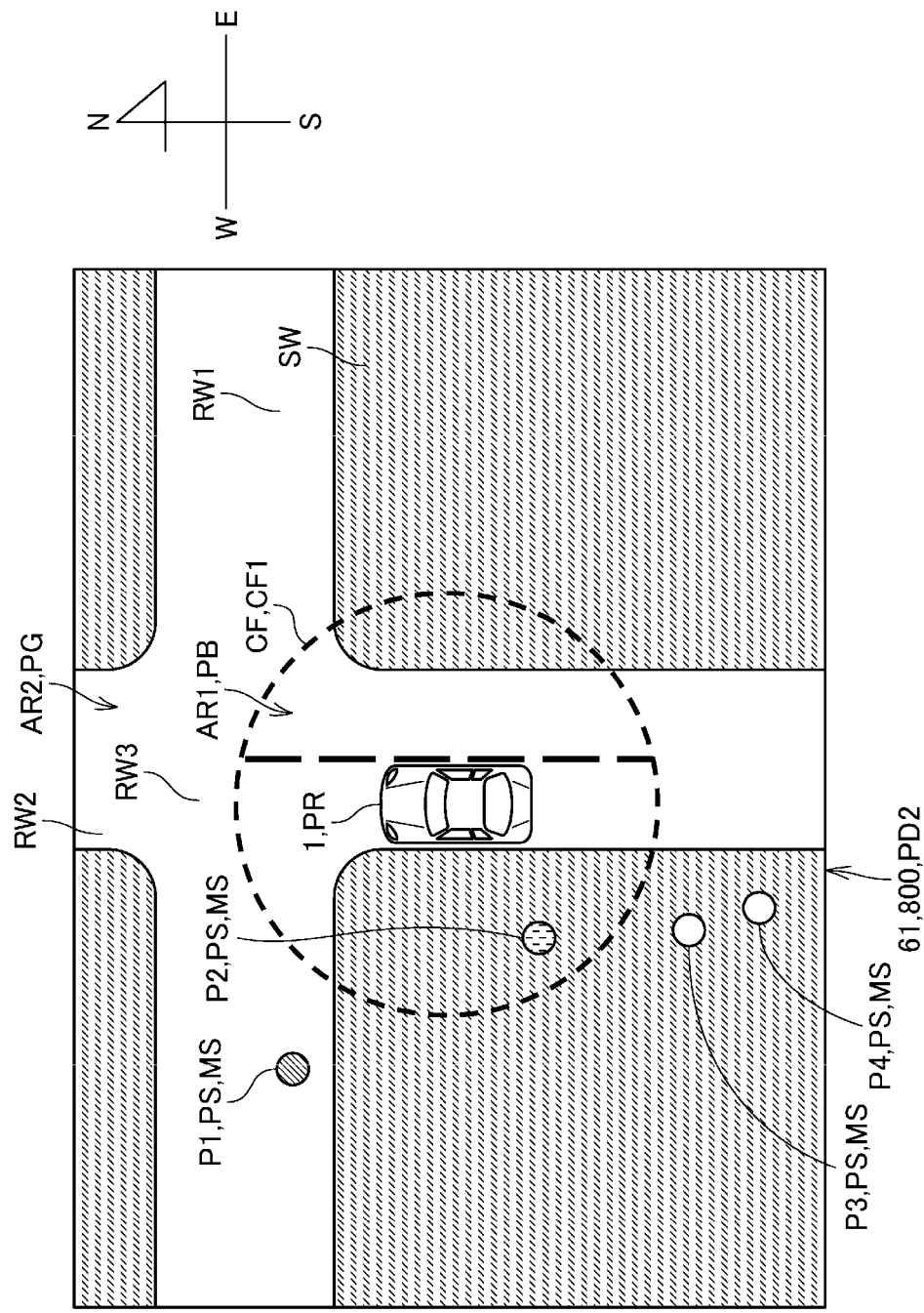
FIG. 8 is a screenshot showing an example of a seventh screen displaying a second display image of a seventh state.

FIG. 8 is a screenshot of an example of a seventh screen 800 that displays the second display image PD2 in a seventh state.

The seventh screen 800 is displayed by the display controlling unit 138 on the display panel 61.

Figure 10:
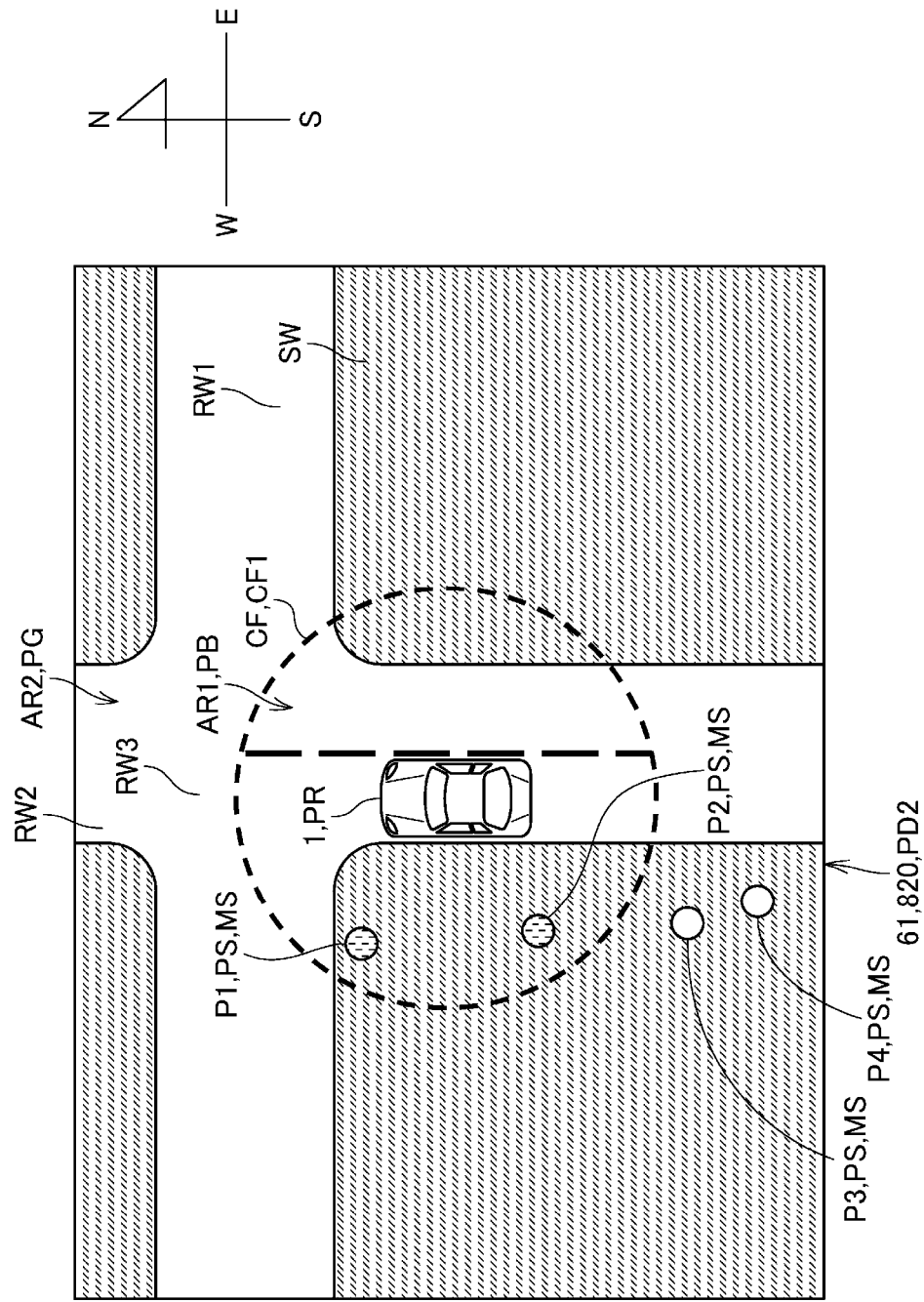
FIG. 10 is a screenshot showing an example of a ninth screen displaying a second display image of a ninth state.

In the second state, shown in FIG. 3, through the sixth state, shown in FIG. 7, the explanations were for cases wherein the distance sensor 40 detected a first vehicle C1 and/or a first vehicle C1, but, in the seventh state, shown in FIG. 8, through the ninth state, shown in FIG. 10, the explanation will be for a case wherein the distance sensor 40 detects a pedestrian, rather than detecting a vehicle C.

As illustrated in FIG. 8, the surroundings information image generating unit 131 generates, as the surroundings information image PS, a first pedestrian mark P1, a second pedestrian mark P2, a third pedestrian mark P3, and a fourth pedestrian mark P4. Each of the first pedestrian mark P1 through the fourth pedestrian mark P4 are circle-shaped marks.

In the first road image RW1, the first pedestrian mark P1 is located to the west of the intersection image RW3. The first pedestrian mark P1 is located in the first road image RW1, and so, for example, is displayed in red, indicating a high need for the user to exercise caution. In FIG. 8, the first pedestrian mark P1 being in red is indicated by the heavy hatching.

The second pedestrian mark P2 is located in a sidewalk image SW within the first region AR1, so, for example, is displayed in yellow, indicating that there is a moderate need for the user to exercise caution. In FIG. 8, the second pedestrian mark P2 being in yellow is indicated by the hatching of a medium density.

The third pedestrian mark P3 and the fourth pedestrian mark P4 are located in the sidewalk image SW, and so, for example, are displayed in gray, indicating that there is a low need for the user to exercise caution. In FIG. 8, the third pedestrian mark P3 and fourth pedestrian mark P4 being in gray is indicated by the light hatching.

The danger detecting unit 134 detects a low danger of each of the pedestrians, corresponding to the first pedestrian mark P1 through the fourth pedestrian mark P4, contacting the vehicle 1. Given this, the display controlling unit 138 displays the boundary line CF in a first color (for example, green) that indicates that the danger is low. For convenience, in FIG. 8 the boundary line CF being green is indicated by a dotted line.

Figure 9:
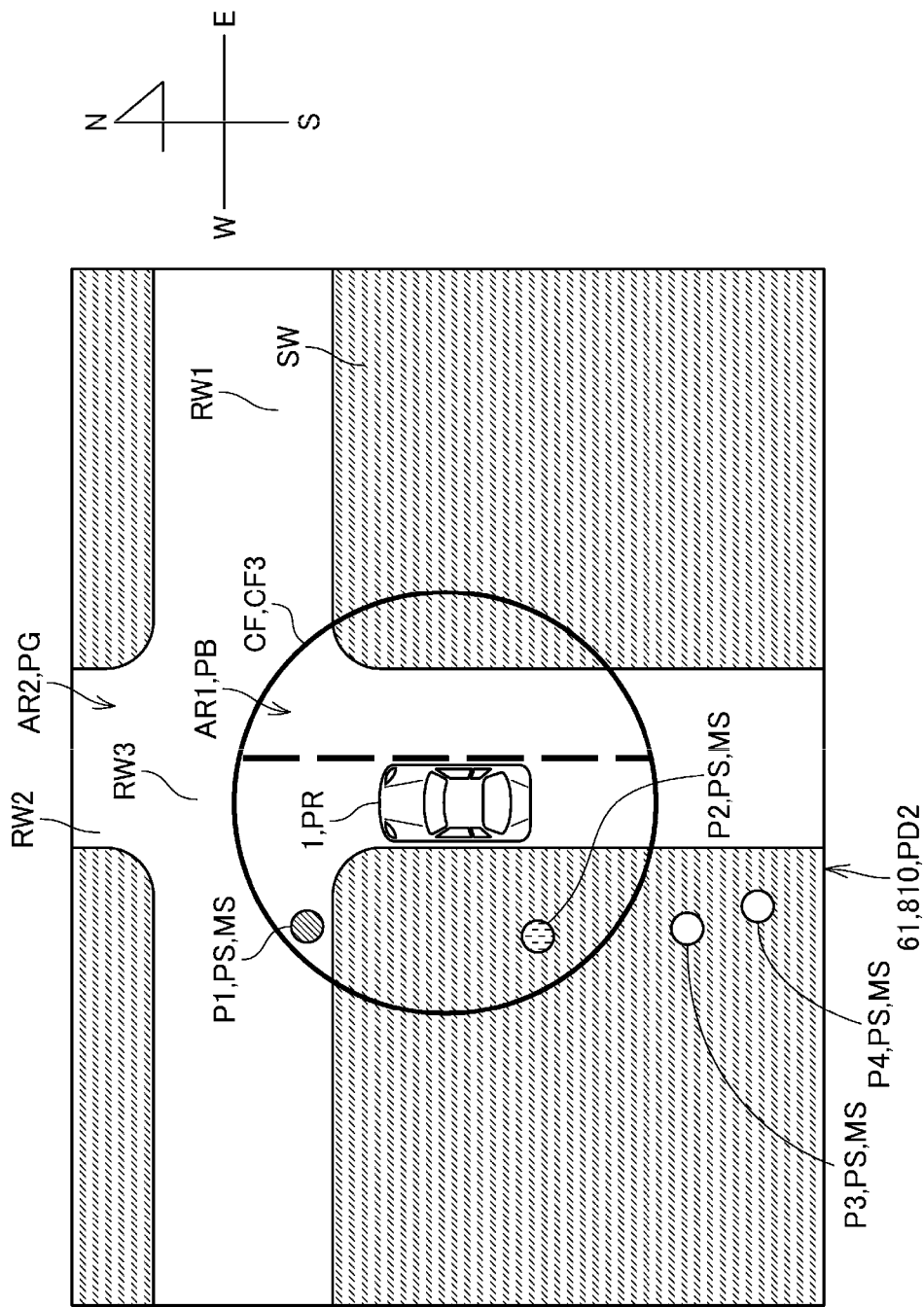
FIG. 9 is a screenshot showing an example of an eighth screen displaying a second display image of an eighth state.

FIG. 9 is a screenshot of an example of an eighth screen 810 that displays the second display image PD2 in an eighth state.

The eighth screen 810 is displayed by the display controlling unit 138 on the display panel 61.

While in the seventh state, shown in FIG. 8, the first pedestrian mark P1 was located in the second region AR2, there is a difference in the eighth state, shown in FIG. 9, in that the first pedestrian mark P1 is located in the first region AR1.

Because the first pedestrian mark P1 is located in the first region AR1, the danger detecting unit 134 detects that the danger of the pedestrian, corresponding to the first pedestrian mark P1, contacting the vehicle 1 is high. Given this, the display controlling unit 138 displays the boundary line CF in a third color (for example, red) that indicates that the danger is high. For convenience, in FIG. 9 the boundary line CF being red is indicated by a solid line.

FIG. 10 is a screenshot of an example of a ninth screen 820 that displays the second display image PD2 in a ninth state.

The ninth screen 820 is displayed by the display controlling unit 138 on the display panel 61.

While in the eighth state, shown in FIG. 9, the first pedestrian mark P1 was located in the first road image RW1, there is a difference in the ninth state, shown in FIG. 10, in that the first pedestrian mark P1 is located in the sidewalk image SW.

The first pedestrian mark P1 is located in a sidewalk image SW within the first region AR1, so, for example, is displayed in yellow, indicating that there is a moderate need for the user to exercise caution.

Because the first pedestrian mark P1 is located in the sidewalk image SW of the first region AR1, the danger detecting unit 134 detects that the danger of the pedestrian, corresponding to the first pedestrian mark P1, contacting the vehicle 1 is low. Given this, the display controlling unit 138 displays the boundary line CF in a first color (for example, green) that indicates that the danger is low. For convenience, in FIG. 10 the boundary line CF being green is indicated by a dotted line.

As explained in reference to FIG. 8 through FIG. 10, the danger detecting unit 134 detects the danger of a pedestrian coming into contact with the vehicle 1 depending on the location of the pedestrian detected by the distance sensor 40. Given this, the display controlling unit 138 displays the boundary line CF in a color that depends on the danger detected by the danger detecting unit 134. The user is thus able to recognize visually, through the color of the boundary line CF, the degree of danger of a pedestrian coming into contact with the vehicle 1.

Figure 11:
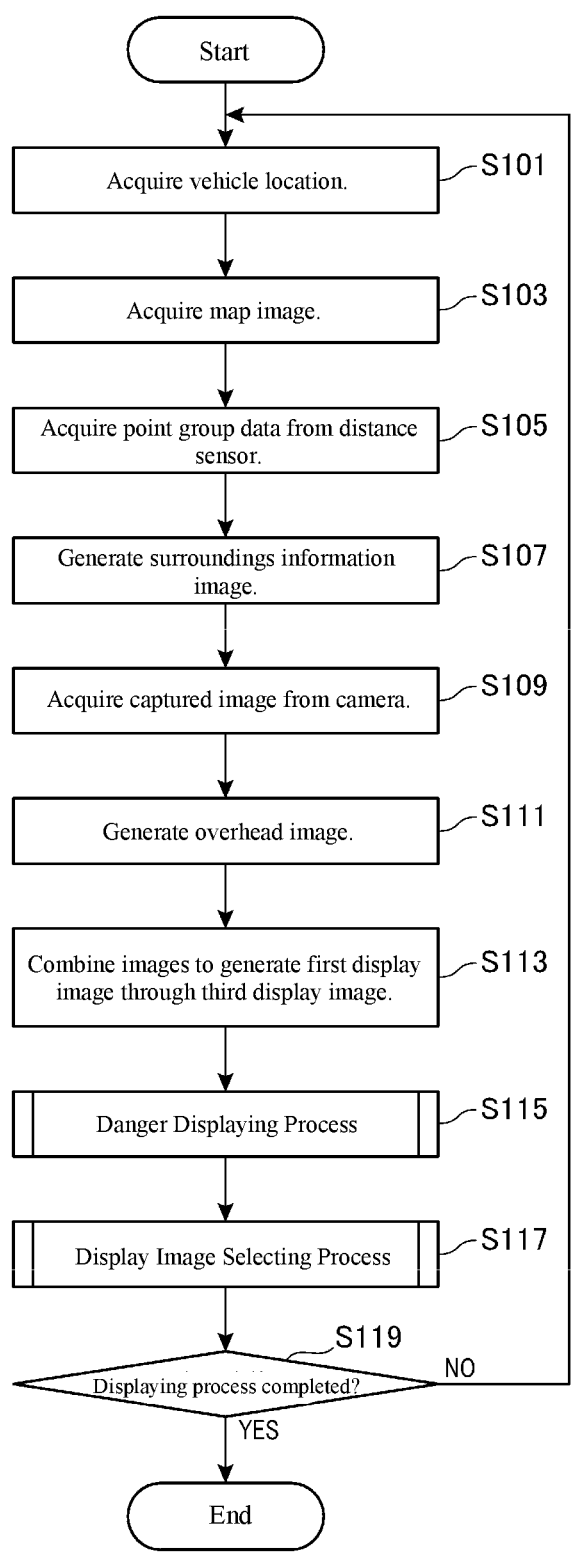
FIG. 11 is a flowchart showing an example of a process for a vehicle surroundings information displaying system.
Figure 12:
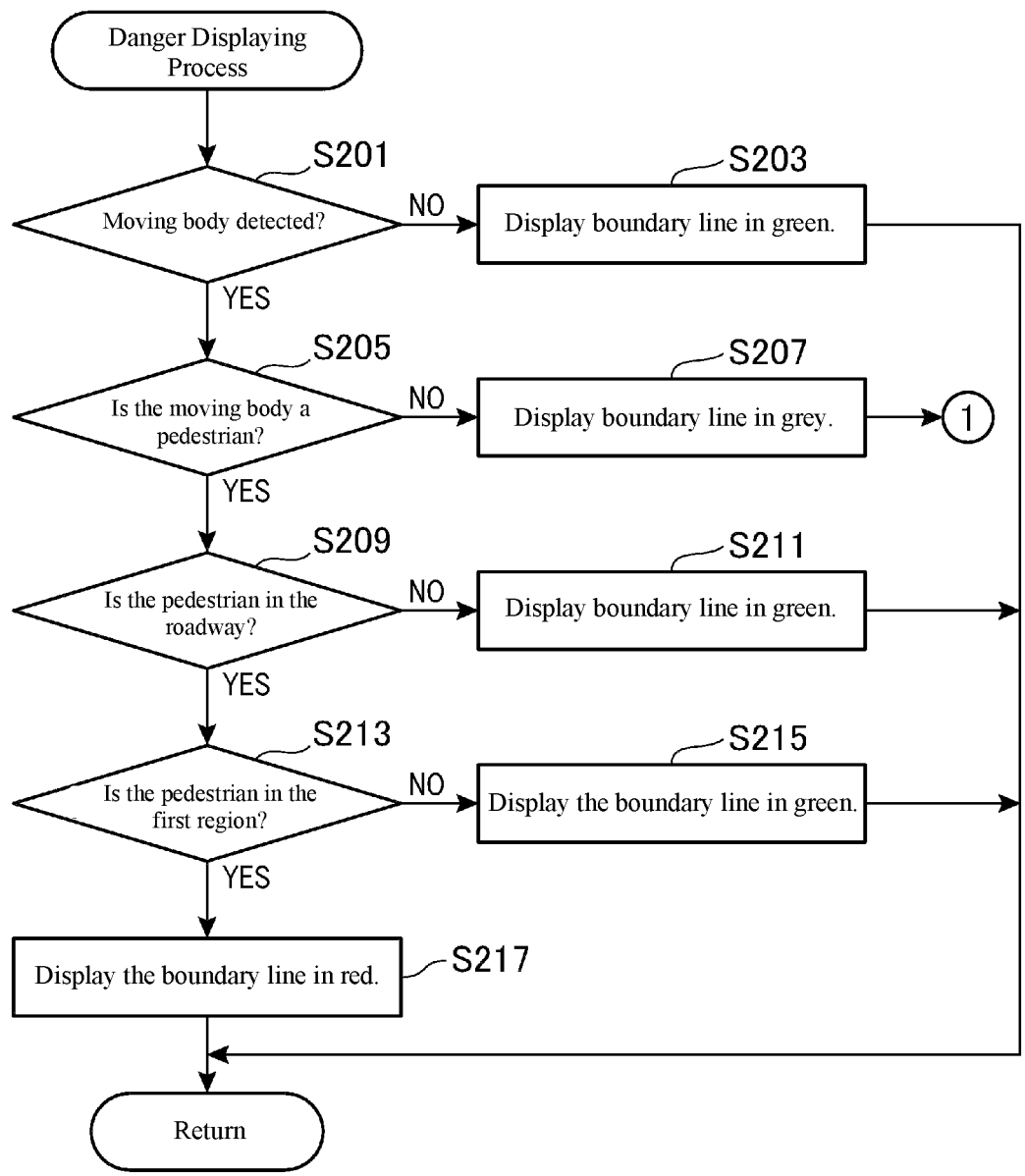
FIG. 12 is a flowchart showing an example for a danger indicating process for a vehicle surroundings information displaying system.
Figure 13:
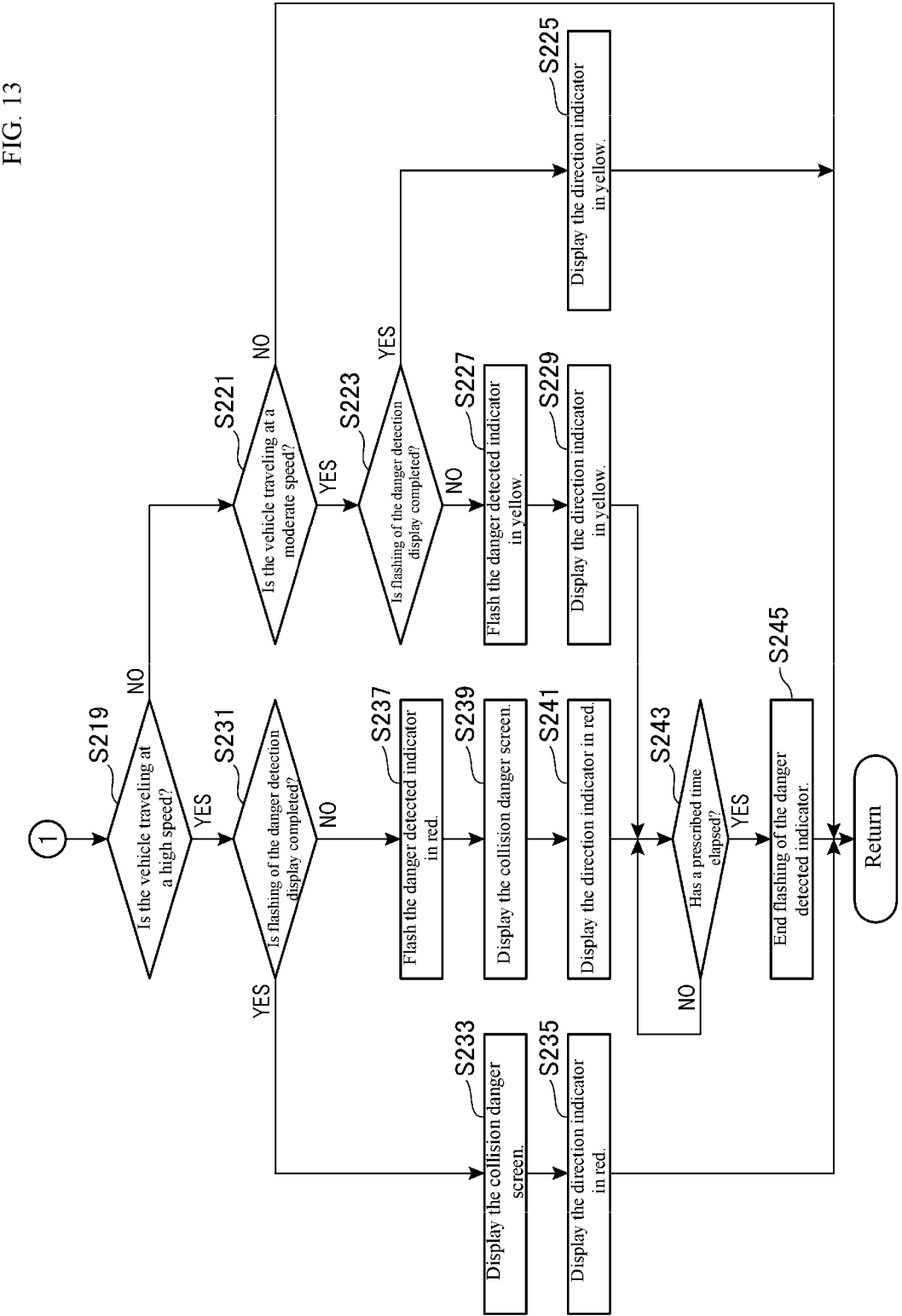
FIG. 13 is a flowchart showing an example for a danger indicating process for a vehicle surroundings information displaying system.

FIG. 11, FIG. 12, and FIG. 13 will be referenced next to explain an example of the image displaying process of the vehicle surroundings information displaying system 100.

FIG. 11 is a flowchart showing an example of the process in the vehicle surroundings information displaying system 100.

First, as shown in FIG. 11, the map image acquiring unit 132, in Step S101, acquires, from the location detecting unit 10, location information that indicates the location of the vehicle 1.

Next, in Step S103, the map image acquiring unit 132 acquires a map image PG of the surroundings of the vicinity of the vehicle 1 through reading out, from the map storing unit 141, a map image PG that corresponds to the location image acquired in Step S101.

Next, in Step S105, the surroundings information image generating unit 131 acquires point cloud data from the distance sensor 40.

Next, in Step S107, the surroundings information image generating unit 131 generates a surroundings information image PS that shows the surroundings information for the vehicle 1, based on the point cloud data acquired in Step S105.

Next, in Step S109, the overhead image acquiring unit 133 acquires captured images captured by the front camera 31, the rear camera 33, the left side camera 35, and the right side camera 37.

Next, in Step S111, the overhead image acquiring unit 133 acquires an overhead image PB of the surroundings of the vehicle 1 by generating the overhead image PB of the surroundings of the vehicle 1 through combining the captured images acquired in Step S109.

Following this, in Step S113, the second display image generating unit 136 combines the map image PG, the vehicle image PR that indicates the location of the vehicle 1, the overhead image PB that is placed surrounding the vehicle image PR, and the surroundings information image PS that is placed surrounding the overhead image PB, to generate the second display image PD2 that is to be displayed on the display panel 61.

Additionally, the first display image generating unit 135 combines the map image PG and the vehicle image PR that indicates the location of the vehicle 1, to generate a first display image PD1 that is to be displayed on the display panel 61.

Moreover, the third display image generating unit 137 combines the map image PG, the vehicle image PR that indicates the location of the vehicle 1, and the overhead image PB that surrounds the vehicle image PR, to generate a third display image PD3 that is to be displayed on the display panel 61.

Next, in Step S115, the second display image generating unit 136 and the display controlling unit 138 execute a "danger indicating process." The "danger indicating process" is a process for generating an image showing the detection results by the danger detecting unit 134 and displaying it on the display panel 61.

Note that the image that shows the detection results of the danger detecting unit 134 includes the boundary line CF, the direction indicator CFE, the danger detected indicator ED, and the collision danger image ARC. The direction indicator CFE includes a first direction indicator CFR and a second direction indicator CFY. The danger detected indicator ED includes a first danger detected indicator ED1 and a second danger detected indicator ED2.

The "danger indicating process" will be explained further in reference to FIG. 12 and FIG. 13.

Next, in Step S117, the display controlling unit 138 executes the display image determining process.

The "display image determining process" indicates the process for determining which image to display, of the first display image PD1, second display image PD2, and third display image PD3 that were generated in Step S113. The display controlling unit 138 displays, on the display panel 61, the display image PD that has been determined.

The "display image determining process" will be explained further in reference to FIG. 14 through FIG. 20.

Next, in Step S119, the vehicle surroundings information displaying system 100 receives an operation by the user on the operating panel 50, and evaluates whether or not to terminate the image displaying process.

If the vehicle surroundings information displaying system 100 evaluates that the image displaying process is not to be terminated (Step S119: NO), processing returns to Step S101. If the vehicle surroundings information displaying system 100 evaluates that the image displaying process is to be terminated (Step S119: YES), processing is then terminated.

Step S105 and Step S107 correspond to an example of the "surroundings information image generating step." Step S101 and Step S103 correspond to an example of the "map image acquiring step." Step S109 and Step S111 correspond to an example of the "overhead image acquiring step." Step S113 corresponds to an example of the "first display image generating step" and "second display image generating step." Step S117 corresponds to an example of the "display controlling step."

As was explained in reference to FIG. 11, the second display image generating unit 136 combines the map image PG, the vehicle image PR that indicates the location of the vehicle 1, the overhead image PB that is placed surrounding the vehicle image PR, and the surroundings information image PS that is placed surrounding the overhead image PB, to generate the second display image PD2 that is to be displayed on the display panel 61. Given this, the display controlling unit 138 displays, on the display panel 61, the second display image PD2 that has been generated by the second display image generating unit 136. Consequently, surroundings information in a broader range than the overhead image PB can be displayed as the second display image PD2.

The danger indicating process executed by the vehicle surroundings information displaying system 100 will be explained next in reference to FIG. 12 and FIG. 13.

FIG. 12 and FIG. 13 are flowcharts each showing an example of a danger indicating process of the vehicle surroundings information displaying system 100. Note that in FIG. 12 and FIG. 13, the explanation was for a case wherein the display controlling unit 138 displays the second display image PD2 on the display panel 61.

First, as depicted in FIG. 12, in Step S201 the danger detecting unit 134 evaluates, based on the point cloud data from the distance sensor 40, whether or not a moving body MS has been detected.

If the danger detecting unit 134 evaluates that no moving body MS is detected (Step S201: NO), processing advances to Step S203.

In Step S203, the danger detecting unit 134 detects that the danger of a moving body MS contacting the vehicle 1 is low. The second display image generating unit 136 generates the boundary line CF in a first color (for example, green) that indicates that the danger of the vehicle 1 making contact with a moving body MS is low. The display controlling unit 138 displays, on the display panel 61, the green first boundary line CF1 that has been generated. Processing then returns to Step S117 of FIG. 11.

If the danger detecting unit 134 evaluates that a moving body MS has been detected (Step S201: YES), processing advances to Step S205.

In Step S205, the surroundings information image generating unit 131 evaluates, based on the point cloud data from the distance sensor 40, whether or not the moving body MS is a pedestrian.

If the surroundings information image generating unit 131 evaluates that the moving body MS is not a pedestrian (Step S205: NO), processing advances to Step S207.

Given this, in Step S207, the second display image generating unit 136 generates the boundary line CF in a second color (for example, gray) that is an inconspicuous color. The display controlling unit 138 displays, on the display panel 61, the gray second boundary line CF2 that has been generated. Additionally, the danger detecting unit 134 detects that the moving body MS is a vehicle C. Thereafter, processing advances to Step S219, shown in FIG. 13.

If the surroundings information image generating unit 131 evaluates that the moving body MS is a pedestrian (Step S205: YES), processing advances to Step S209.

In Step S209, the danger detecting unit 134 evaluates whether or not the pedestrian is in the roadway.

If the danger detecting unit 134 evaluates that the pedestrian is not in the roadway (Step S209: NO), processing advances to Step S211.

In Step S211, the danger detecting unit 134 evaluates that the pedestrian is on a sidewalk, and detects that the danger that the pedestrian will contact the vehicle 1 is low. The second display image generating unit 136 generates the boundary line CF in a first color (for example, green) that indicates that the danger of the vehicle 1 making contact with a pedestrian is low. The display controlling unit 138 displays, on the display panel 61, the green first boundary line CF1 that has been generated. Processing then returns to Step S117 of FIG. 11.

If the danger detecting unit 134 evaluates that the pedestrian is on the roadway (Step S209: YES), processing advances to Step S213.

In Step S213, the danger detecting unit 134 evaluates whether or not the pedestrian is in the first region AR1.

If the danger detecting unit 134 evaluates that the pedestrian is not in the first region AR1 (Step S213: NO), processing advances to Step S215.

In Step S215, the danger detecting unit 134 detects that the danger that the pedestrian will contact the vehicle 1 is low. The second display image generating unit 136 generates the boundary line CF in a first color (for example, green) that indicates that the danger of the vehicle 1 making contact with a pedestrian is low. The display controlling unit 138 displays, on the display panel 61, the green first boundary line CF1 that has been generated. Processing then returns to Step S117 of FIG. 11.

If the danger detecting unit 134 evaluates that the pedestrian is in the first region AR1 (Step S213: YES), processing advances to Step S217.

In Step S217, the danger detecting unit 134 detects that the danger that the pedestrian will contact the vehicle 1 is high. The second display image generating unit 136 generates the boundary line CF in a third color (for example, red) that indicates that the danger of the vehicle 1 making contact with a pedestrian is high. The display controlling unit 138 displays, on the display panel 61, the red third boundary line CF3 that has been generated. Processing then returns to Step S117 of FIG. 11.

If NO in Step S205, then, in Step S207, the detection is that the moving body MS is a vehicle C, and, as shown in FIG. 13, in Step S219 the danger detecting unit 134 evaluates whether or not the travel speed of the vehicle C is a high speed of no less than a first speed (for example, 70 km/h).

If the danger detecting unit 134 evaluates that the travel speed of the vehicle C is a high speed (Step S219: YES), processing advances to Step S231. If the danger detecting unit 134 evaluates that the travel speed of the vehicle C is not a high speed (Step S219: NO), processing advances to Step S221.

Given this, in Step S221 the danger detecting unit 134 evaluates whether or not the travel speed of the vehicle C is a medium speed of no less than a second speed (for example, 30 km/h).

If the danger detecting unit 134 evaluates that the travel speed of the vehicle C not a medium speed (Step S221: NO), processing then returns to Step S117 in FIG. 11. If the danger detecting unit 134 evaluates that the travel speed of the vehicle C is a medium speed (Step S221: YES), processing advances to Step S223.

In Step S223, the display controlling unit 138 evaluates whether or not to terminate the flashing of the danger detected indicator ED corresponding to a medium-speed vehicle C. Here the danger detected indicator ED is the second danger detected indicator ED2 shown in FIG. 3.

If the display controlling unit 138 evaluates that flashing of the danger detected indicator ED is to be terminated (Step S223: YES), processing advances to Step S225.

In Step S225, the danger detecting unit 134 detects the direction in which there is a danger of contacting the vehicle 1. The second display image generating unit 136 generates the direction indicator CFE as a yellow arc-shaped image, and locates it on the circumferential boundary line CF. The display controlling unit 138 displays the direction indicator CFE on the display panel 61. The direction indicator CFY corresponds to the second direction indicator CFE shown in FIG. 3. Processing then returns to Step S117 of FIG. 11.

Note that while in Step S219 the danger detecting unit 134 evaluates whether or not the travel speed of the vehicle C is a high speed, there is no limitation thereto. The danger detecting unit 134 may instead, or in addition to, evaluate the travel speed of the vehicle C, and evaluate the danger through whether or not the difference in travel speed of the vehicle C from the travel speed of the vehicle 1 is greater than a control value.

For example, the danger detecting unit 134 may evaluate the danger through whether or not the speed ratio of the travel speed of the vehicle 1 and the travel speed of the vehicle C is above 1:2. Moreover, for example, it may evaluate the danger depending on whether or not the difference between the travel speed of the vehicle 1 and the travel speed of the vehicle C is greater than 60 km/h.

This makes it possible to exclude, from the danger evaluation, a case wherein both the vehicle 1 and the vehicle C are traveling at identical high speeds when traveling in the same direction on a high-speed road, for example. Moreover, when the vehicle 1 and the vehicle C are traveling in the same direction, danger may be detected if they are rapidly approaching each other.

If the display controlling unit 138 evaluates that the flashing of the danger detected indicator ED is not to be terminated (Step S223: NO), processing advances to Step S227.

In Step S227, the danger detecting unit 134 detects the danger of contacting the vehicle 1 as moderate. The display controlling unit 138 determines the color for the danger detected indicator ED to be, for example, yellow. The display controlling unit 138 flashes the danger detected indicator ED at an end portion of the display panel 61 in the direction, in reference to the vehicle 1, wherein there is a danger of contact with the vehicle 1. The danger detected indicator ED corresponds to the second danger detected indicator ED2 shown in FIG. 3.

Next, in Step S229, the danger detecting unit 134 detects the direction wherein there is a danger of contacting the vehicle 1. The second display image generating unit 136 generates the direction indicator CFE as a yellow arc-shaped image, and locates it on the circumferential boundary line CF. The display controlling unit 138 displays the direction indicator CFE on the display panel 61. The direction indicator CFY corresponds to the second direction indicator CFE shown in FIG. 3. Processing then advances to S243.

If YES in Step S219, then, in Step S231, the display controlling unit 138 evaluates whether or not to terminate flashing of the danger detected indicator ED. Here the danger detected indicator ED is the first danger detected indicator ED1 shown in FIG. 3.

If the display controlling unit 138 evaluates that flashing of the danger detected indicator ED is to be terminated (Step S231: YES), processing advances to Step S233.

In Step S233, the second display image generating unit 136 generates the collision danger image ARC, and the display controlling unit 138 displays the collision danger image ARC. The collision danger image ARC is an image showing the direction of travel of the vehicle C, and the ranges wherein there is a danger of a collision. The collision danger image ARC is the collision danger image ARC shown in FIG. 3.

Next, in Step S235, the danger detecting unit 134 detects the direction wherein there is a danger of contacting the vehicle 1. The second display image generating unit 136 generates the direction indicator CFE as a red arc-shaped image, and locates it on the circumferential boundary line CF. The display controlling unit 138 displays the direction indicator CFE on the display panel 61. The direction indicator CFE corresponds to the first direction indicator CFR shown in FIG. 3. Processing then returns to Step S117 of FIG. 11.

If NO in Step S231, then, in Step S237, the danger detecting unit 134 detects a high danger of contact with the vehicle 1. The display controlling unit 138 determines the color for the danger detected indicator ED to be, for example, red. The display controlling unit 138 flashes the danger detected indicator ED at an end portion of the display panel 61 in the direction, in reference to the vehicle 1, wherein there is a danger of contact with the vehicle 1.

The danger detected indicator ED corresponds to the first danger detected indicator ED1 shown in FIG. 3.

Next, in Step S239, the second display image generating unit 136 generates the collision danger image ARC, and the display controlling unit 138 displays the collision danger image ARC.

Next, in Step S241, the danger detecting unit 134 detects the direction wherein there is a danger of contacting the vehicle 1. The second display image generating unit 136 generates the direction indicator CFE as a red arc-shaped image, and locates it on the circumferential boundary line CF. The display controlling unit 138 displays the direction indicator CFE on the display panel 61. The direction indicator CFE corresponds to the first direction indicator CFR shown in FIG. 3.

Next, in Step S243, the display controlling unit 138 evaluates whether or not a prescribed time interval (for example, an interval of three seconds) has elapsed since the start of the flashing display of the danger detected indicator ED in Step S227 or Step S237.

If the display controlling unit 138 evaluates that the prescribed interval has not elapsed (Step S243: NO), processing goes into a standby state. If the display controlling unit 138 evaluates that the prescribed interval has elapsed (Step S243: YES), processing advances to Step S245.

In Step S245, the display controlling unit 138 terminates the flashing display of the danger detected indicator ED. Processing then returns to Step S117 of FIG. 11.

As explained in reference to FIG. 12 and FIG. 13, the moving body MS is a vehicle C, and the first danger detected indicator ED1, the collision danger image ARC, and the first direction indicator CFR are displayed upon detection that the travel speed of the vehicle C is a high speed and the danger of contact with the vehicle 1 is high.

Because the first danger detected indicator ED1 is displayed, the user is able to recognize visually that a vehicle C wherein there is a high danger of contact with the vehicle 1 has been detected at the direction indicated by the first danger detected indicator ED1.

Additionally, the collision danger image ARC is displayed, enabling the user to recognize visually the range of the danger of contact with the vehicle C that is traveling at a high speed.

The display of the first direction indicator CFR enables the user to recognize visually the direction wherein there is a high possibility of contact with a vehicle C that is traveling at a high speed.

A case of transitioning from the first display image PD1 to the second display image PD2 will be explained next in reference to FIG. 14 through FIG. 18 for an example of the transition of the display image PD that is displayed on the display panel 61.

Ordinal directions are shown in each FIG. 14 through FIG. 18. Upward in the figures corresponds to north; downward in the figures corresponds to south; to the right in the figures corresponds to the east; and to the left in the figures corresponds to west.

Figure 14:
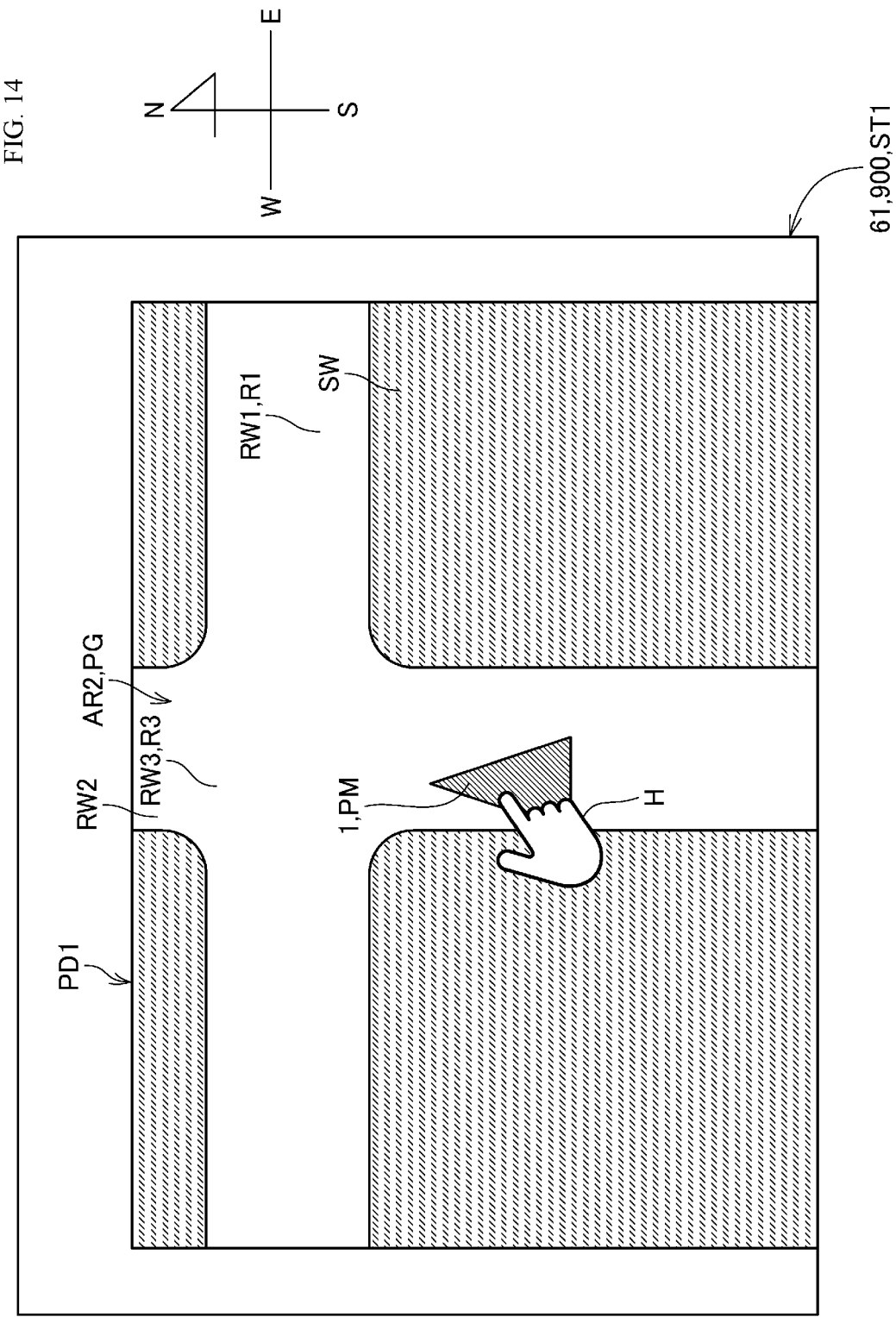
FIG. 14 is a screenshot showing an example of a $10^{th}$ screen displaying a first display state of a transition to a second display image from a first display image.

FIG. 14 is a screenshot showing an example of a $10^{th}$ screen displaying a first display state ST1 of a transition to a second display image PD2 from a first display image PD1. In the $10^{th}$ screen 900, the first display image PD1 is displayed by the display controlling unit 138. The first display image PD1 displays a portion of the $10^{th}$ screen 900.

Specifically, the first display image PD1 is displayed in a center portion, in the crosswise direction, of the $10^{th}$ screen 900, displayed toward the bottom, in the vertical direction, of the $10^{th}$ screen 900.

The first display image PD1 is generated by the first display image generating unit 135. The first display image PD1 includes the map image PG and a vehicle mark PM that indicates the location of the vehicle 1.

The map image PG is identical to the map image PG that has been explained in reference to FIG. 2. That is, the map image PG includes a road image RW and a sidewalk image SW. The road image RW includes a first road image RW1 showing a first road R1 that extends in the east-west direction, a second road image RW2 showing a second road R2 that extends in the north-south direction, and an intersection image RW3 showing an intersection R3 wherein the first road R1 and the second road R2 intersect.

The vehicle 1 is traveling northbound on the second road R2, approaching the intersection R3.

Given this, the vehicle mark PM is placed by the first display image generating unit 135 to the south of the intersection image RW3 on the second road image RW2.

The vehicle mark PM is, for example, a triangle-shaped mark. The vehicle mark PM is, for example, an isosceles triangle-shaped mark, oriented with the vertex with the smallest vertex angle in the direction of travel of the vehicle 1. That is, of the three vertices that structure the vehicle mark PM, the vertex with the smallest vertex angle is oriented in the direction of north in the vehicle mark PM.

As depicted in FIG. 14, the user touches the vehicle mark PM with a finger. The touch sensor 63 detects a pressure value PV due to a touch operation by the finger of the user on the display panel 61, to generate a pressure signal indicating the pressure value PV of the touch operation that has been detected. Given this, the display unit 60 outputs, to the vehicle surroundings information displaying system 100, a pressure signal that indicates the pressure value PV.

Based on the pressure value PV, the display controlling unit 138 transitions the state of the display image PD that is displayed on the display panel 61.

Figure 15:
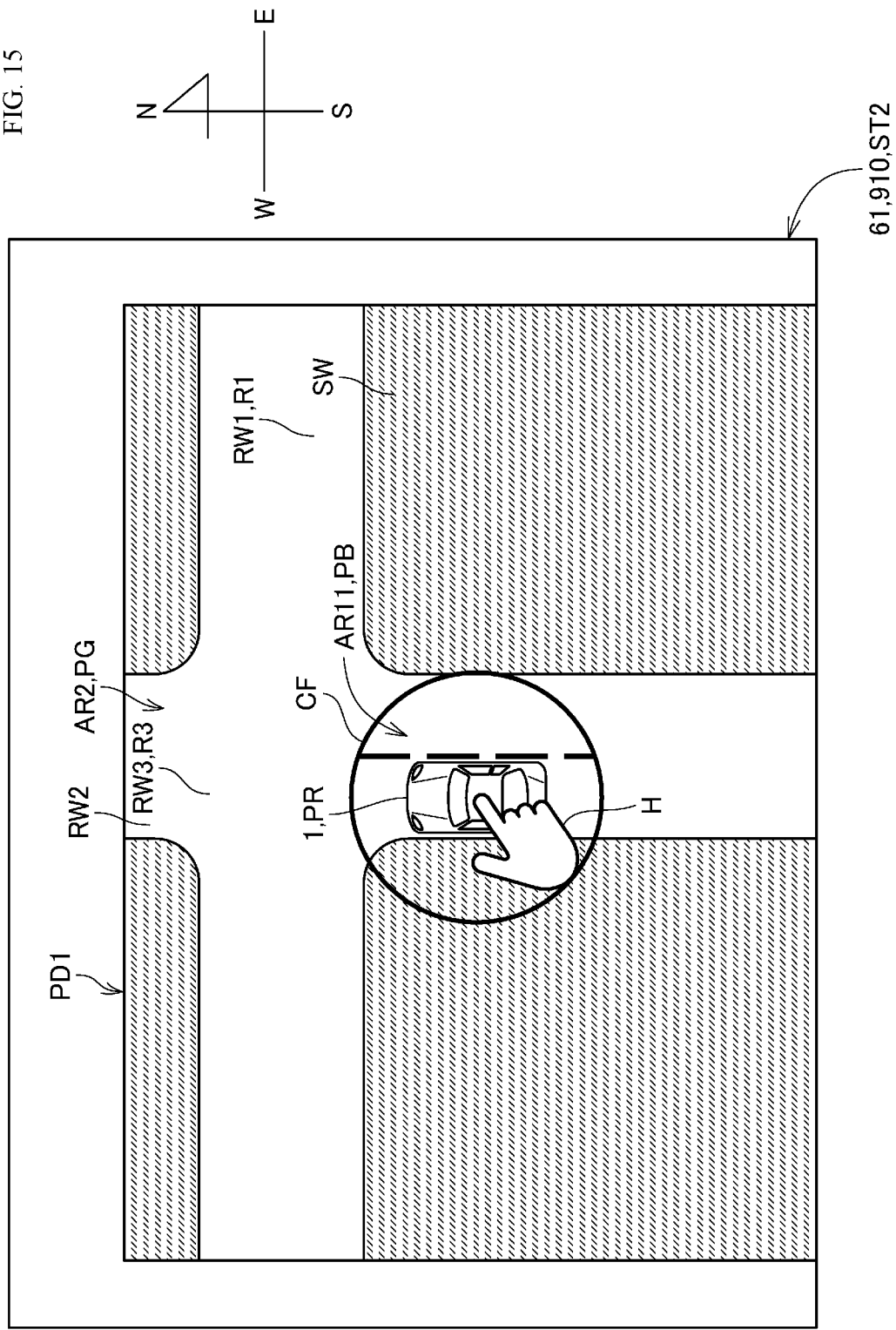
FIG. 15 is a screenshot showing an example of an $11^{th}$ screen displaying a second display state of a transition to a second display image from a first display image.

If the pressure value PV is less than a second pressure value PV2, the display controlling unit 138 will display the $11^{th}$ screen 910, depicted in FIG. 15.

FIG. 15 is a screenshot showing an example of an $11^{th}$ screen 910 displaying a second display state ST2 of a transition to a second display image PD2 from a first display image PD1. In the second display state ST2, the pressure value PV is less than the second pressure value PV2.

The display controlling unit 138 places a circle region AR11 centered on the location of the vehicle 1 in the first display image PD1, and displays the overhead image PB and the vehicle image PR within the circle region AR11.

The size of the circle region AR11 with respect to the first display image PD1 is determined by the display controlling unit 138 in response to the pressure value PV. The size of the circle region AR11 with respect to the first display image PD1 is determined by the display controlling unit 138 so as to be larger the greater the pressure value PV.

However, the size of the circle region AR11 with respect to the first display image PD1 is smaller than the first region AR1 with respect to the first display image PD1 that is depicted in FIG. 2 through FIG. 10.

The vehicle image PR is placed, by the display controlling unit 138, at the location of the vehicle 1, instead of the vehicle mark PM depicted in FIG. 14.

If the touch operation is terminated while in the state wherein the $11^{th}$ screen 910, depicted in FIG. 15, is displayed on the display panel 61, the display controlling unit 138 displays, on the display panel 61, the 10$^{th}$ screen 900, depicted in FIG. 14.

Figure 16:
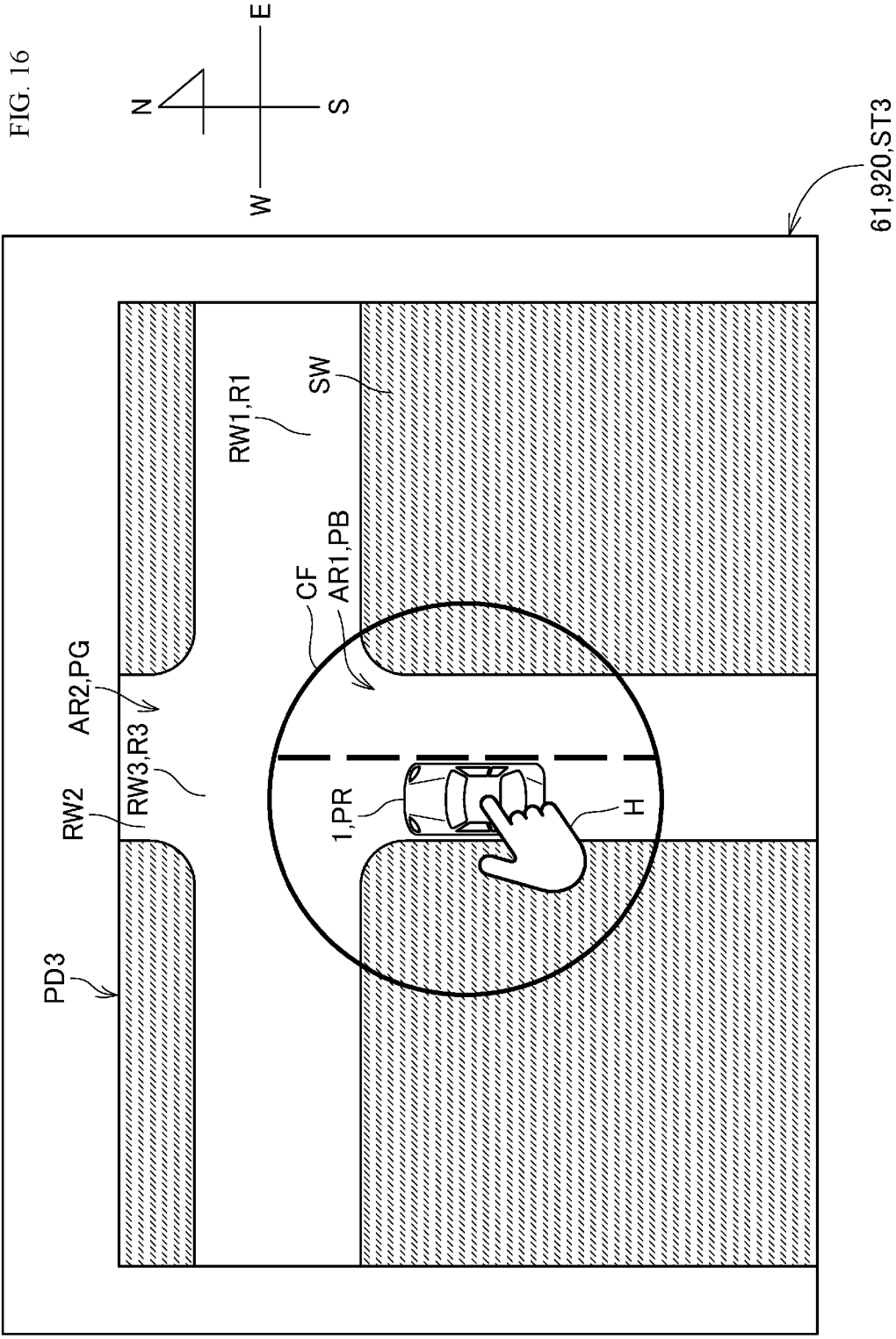
FIG. 16 is a screenshot showing an example of a $12^{th}$ screen displaying a third display state of a transition to second display image from a first display image.

If, in the state wherein the 11$^{th}$ screen 910, depicted in FIG. 15, is displayed on the display panel 61 (the second state ST2), the pressure value PV by the touch operation by the finger of the user on the vehicle image PR arrives at a second pressure value PV2, the display controlling unit 138 displays, on the display panel 61, a 12$^{th}$ screen 920, depicted in FIG. 16.

FIG. 16 is a screenshot showing an example of a 12$^{th}$ screen 920 displaying a third display state ST3 of a transition to a second display image PD2 from a first display image PD1.

If the pressure value PV has arrived at the second pressure value PV2, the display controlling unit 138 will display the 12$^{th}$ screen 920 on the display panel 61.

In the 12$^{th}$ screen 920, the third display image PD3 is displayed by the display controlling unit 138. The third display image PD3 is generated by the third display image generating unit 137. The third display image PD3 is generated by the third display image generating unit 137 combining the map image PG, the vehicle image PR that indicates the location of the vehicle 1, and the overhead image PB that is placed surrounding the vehicle image PR. The boundary line CF is displayed at the boundary between the overhead image PB and the map image PG.

If the touch operation is terminated while in the state wherein the 12$^{th}$ screen 920, depicted in FIG. 16, is displayed on the display panel 61, the display controlling unit 138 will continue to display the 12$^{th}$ screen 920, depicted in FIG. 16, on the display panel 61.

Figure 17:
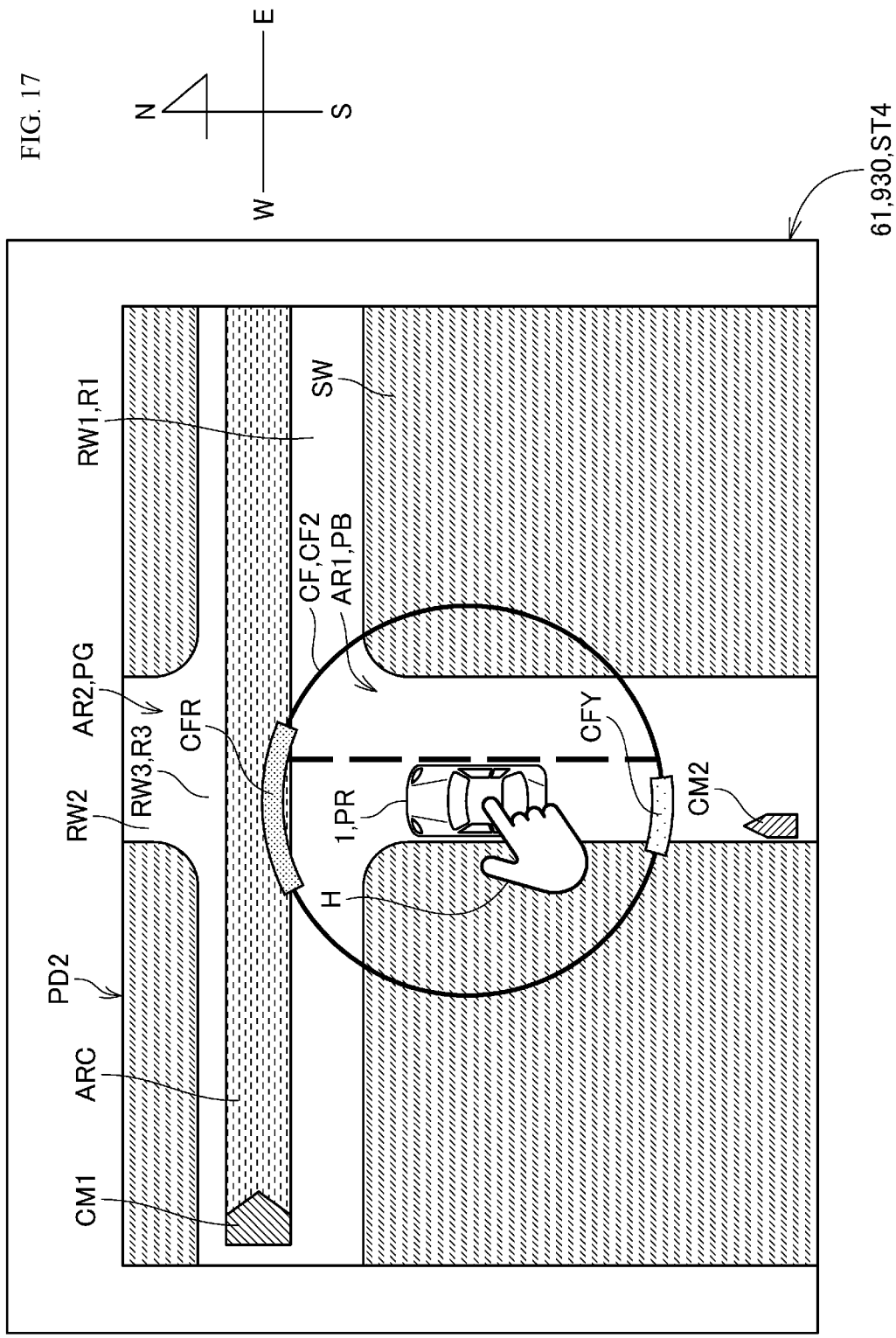
FIG. 17 is a screenshot showing an example of a $13^{th}$ screen displaying a fourth display state of a transition to a second display image from a first display image.

If the pressure value PV has arrived at a first pressure value PV1, the display controlling unit 138 will display a 13$^{th}$ screen 930, depicted in FIG. 17, on the display panel 61. The first pressure value PV1 is greater than the second pressure value PV2.

FIG. 17 is a screenshot showing an example of a 13$^{th}$ screen 930 displaying a fourth display state ST4 of a transition to a second display image PD2 from a first display image PD1.

In the 13$^{th}$ screen 930, the second display image PD2 is displayed by the display controlling unit 138. The second display image PD2 is generated by the second display image generating unit 136. The second display image PD2 is generated by the second display image generating unit 136 combining the map image PG, the vehicle image PR that indicates the location of the vehicle 1, the overhead image PB that is placed surrounding the vehicle image PR, and the surroundings information image PS that is placed surrounding the overhead image PB. Additionally, the second display image PD2 includes the boundary line CF.

The surroundings information image PS includes the first vehicle mark CM1, explained in reference to FIG. 3, and the second vehicle mark CM2.

Additionally, the first direction indicator CFR, the second direction indicator CFY, and the collision danger image ARC are displayed in the 13$^{th}$ screen 930. The first direction indicator CFR, the second direction indicator CFY, and the collision danger image ARC are displayed in the display panel 61 by the display controlling unit 138.

If the touch operation is terminated while in the state wherein the 13$^{th}$ screen 930, depicted in FIG. 17, is displayed on the display panel 61, the display controlling unit 138 will continue to display the 13$^{th}$ screen 930, depicted in FIG. 17, on the display panel 61.

Figure 18:
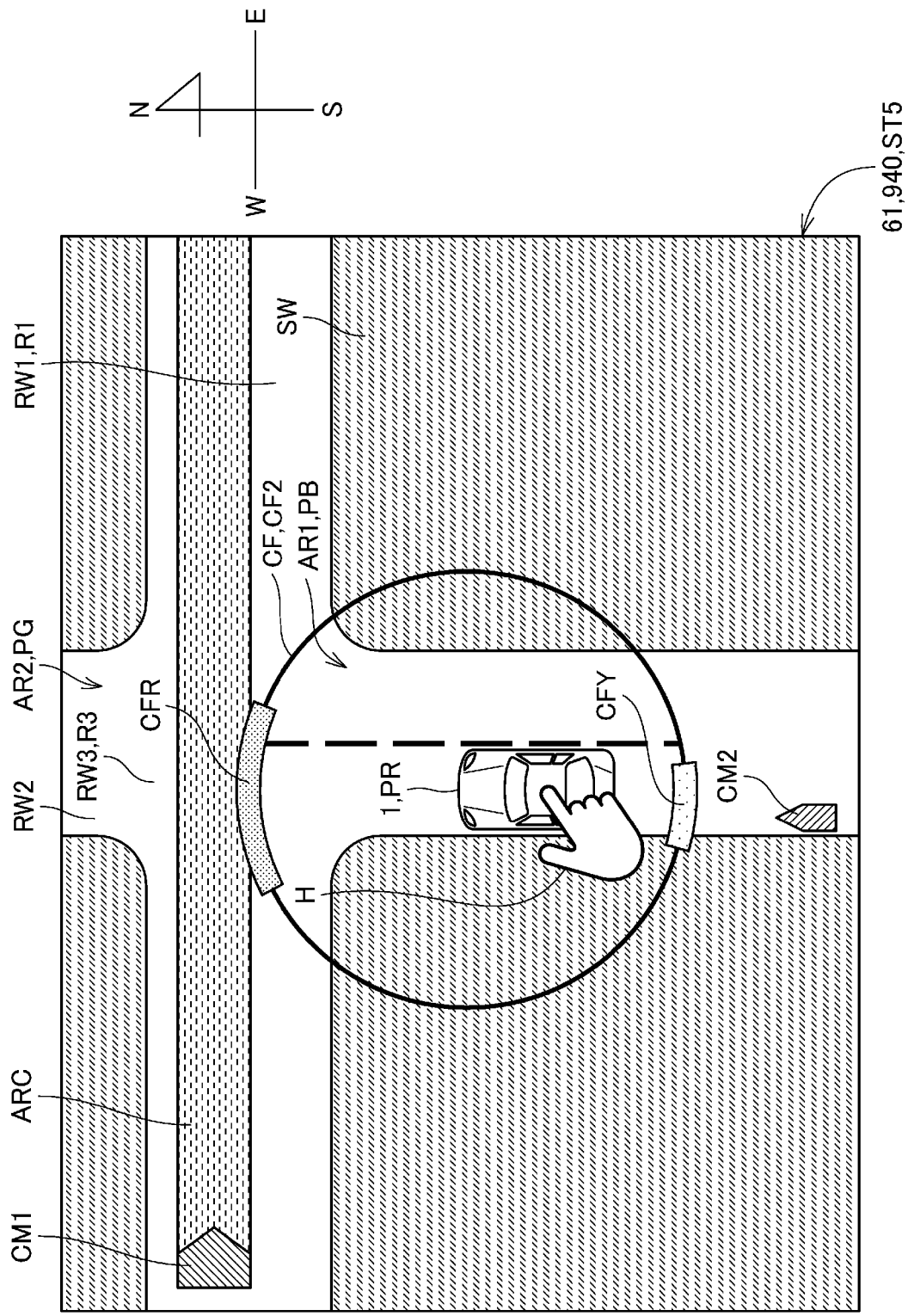
FIG. 18 is a screenshot showing an example of a $14^{th}$ screen displaying a fifth display state of a transition to a second display image from a first display image.

If the pressure value PV has arrived at a third pressure value PV3, the display controlling unit 138 will display a 14$^{th}$ screen 940, depicted in FIG. 18, on the display panel 61. The third pressure value PV3 is greater than the first pressure value PV1.

FIG. 18 is a screenshot showing an example of a 14$^{th}$ screen 940 displaying a fifth display state ST5 of a transition to a second display image PD2 from a first display image PD1.

The entirety of the second display image PD2 is displayed in the 14$^{th}$ screen 940.

Additionally, the first direction indicator CFR, the second direction indicator CFY, and the collision danger image ARC are displayed in the 14$^{th}$ screen 940. The first direction indicator CFR, the second direction indicator CFY, and the collision danger image ARC are displayed in the display panel 61 by the display controlling unit 138.

The 14$^{th}$ screen 940 corresponds to the third screen 720 that is depicted in FIG. 4.

If the touch operation is terminated while in the state wherein the 14$^{th}$ screen 940, depicted in FIG. 18, is displayed on the display panel 61, the display controlling unit 138 will continue to display the 14$^{th}$ screen 940, depicted in FIG. 18, on the display panel 61.

As explained in reference to FIG. 14 through FIG. 18, the user performs a touch operation with a finger on the vehicle mark PM or the vehicle image PR, and can cause the display image PD that is displayed on the display panel 61 to change from a first display image PD1 to a second display image PD2 by increasing the pressure value PV, of the touch operation, to a first pressure value PV1. This makes it possible to switch the image displayed on the display panel 61 from the first display image PD1 to the second display image PD2 through a simple operation.

Moreover, the display controlling unit 138 switches from the first display image PD1 to the second display image PD2 via a third display image PD3. Thus this makes it possible to display the third display image PD3 on the display panel 61. Consequently, the third display image PD3 can be displayed on the display panel 61 when the vehicle 1 is traveling at a low speed (specifically, when the vehicle 1 is attempting to park by backing into a parking space).

Figure 19:
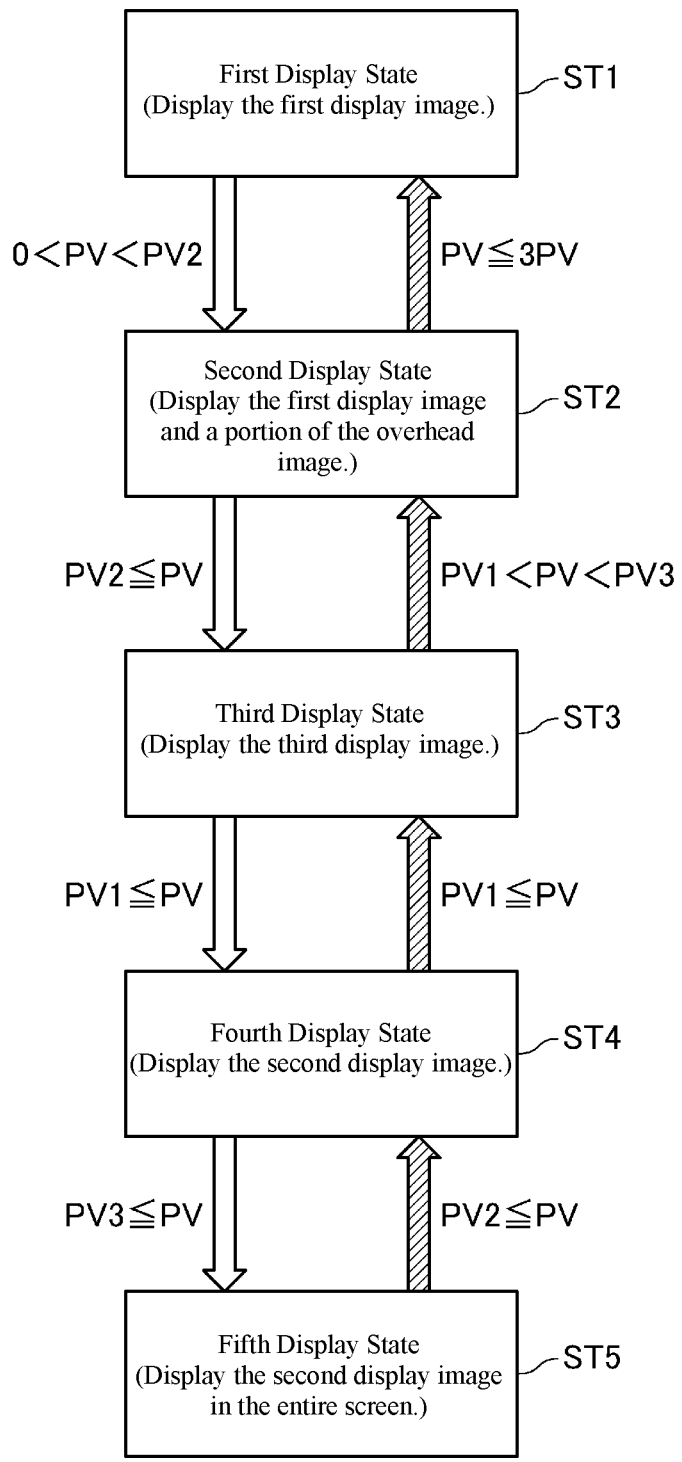
FIG. 19 is a state transition diagram depicting an example of transitions between a first display image, a second display image, and a third display image.

FIG. 19 is a state transition diagram depicting an example of transitions between a first display image PD1, a second display image PD2, and a third display image PD3. The display state, displayed on the display panel 61, is transitioned, as depicted in FIG. 19, through the display controlling unit 138 executing the "display image determining process."

The case of transitioning from the first display state ST1, wherein the first display image PD1 is displayed on the display panel 61, to the fifth display state ST5, wherein the second display image PD2 is displayed on the entire screen of the display panel 61 will be explained first. Note that, for convenience, in FIG. 19 the explanation is for a case wherein, after the beginning of the touch operation, the touch operation is continued until the pressure value PV arrives at the third pressure value PV3.

When a touch operation by the finger of a user is detected and the pressure value PV by the touch operation is less than the second pressure value PV2, there is a transition from the first display state ST1 to the second display state ST2. As explained in reference to FIG. 15, in the second display state ST2 a circle region AR11 is placed in the first display image PD1, and the overhead image PB and the vehicle image PR are displayed in the circle region AR11. The size of the circle region AR11 is smaller than the first region AR1.

Additionally, when the pressure value PV is increased to arrive at the second pressure value PV2, there is a transition from the second display state ST2 to the third display state ST3. In the third display state ST3, the third display image PD3 is displayed on the display panel 61.

Additionally, when the pressure value PV further increases to arrive at the first pressure value PV1, there is a transition from the third display state ST3 to the fourth display state ST4. In the fourth display state ST4, the second display image PD2 is displayed on the display panel 61.

Additionally, when the pressure value PV further increases to arrive at the third pressure value PV3, there is a transition from the fourth display state ST4 to the fifth display state ST5. In the fifth display state ST5, the second display image PD2 is displayed in the entire screen of the display panel 61.

In this way, the user is able to cause a transition from the first display state ST1 to the third display state ST3, to display the third display image PD3 on the display panel 61, by increasing the pressure value PV through the touch operation up to the second pressure value PV2.

Additionally, the user is able to cause a transition from the third display state ST3 to the fourth display state ST4, to display the second display image PD2 on the display panel 61, by increasing the pressure value PV up to the first pressure value PV1.

Furthermore, the user is able to cause a transition from the fourth display state ST4 to the fifth display state ST5, to display the second display image PD2 on the entire screen of the display panel 61, by increasing the pressure value PV up to the third pressure value PV3.

The case of transitioning from the fifth display state ST5, wherein the second display image PD2 is displayed on the entire screen of the display panel 61, to the first display state ST1, wherein the first display image PD1 is displayed on the display panel 61, will be explained next. Note that, for convenience, in FIG. 19 the explanation is for a case wherein, after the beginning of the touch operation, the touch operation is continued until the pressure value PV arrives at the third pressure value PV3.

When a touch operation by the finger of a user is detected and the pressure value PV by the touch operation is at least as great as the second pressure value PV2, there is a transition from the fifth display state ST5 to the fourth display state ST4.

Additionally, when the pressure value PV is increased to arrive at the first pressure value PV1, there is a transition from the fourth display state ST4 to the third display state ST3. In the third display state ST3, the third display image PD3 is displayed on the display panel 61.

Moreover, when the pressure value PV is increased further to be greater than the first pressure value PV1 and less than the third pressure value PV3, there is a transition from the third display state ST3 to the second display state ST2. In the second display state ST2, a circle region AR11 that is smaller than the first region AR1 is placed in the first display image PD1, and the overhead image PB and the vehicle image PR are displayed in the circle region AR11.

Additionally, when the pressure value PV further increases to arrive at the third pressure value PV3, there is a transition from the second display state ST2 to the first display state ST1. In the first display state ST1, the first display image PD1 is displayed on the display panel 61.

In this way, the user is able to cause a transition from the fifth display state ST5 to the fourth display state ST4, to display the second display image PD2 in a portion of the display panel 61, by increasing the pressure value PV through the touch operation up to the second pressure value PV2.

Additionally, the user is able to cause a transition from the fourth display state ST4 to the third display state ST3, to display the third display image PD3 on the display panel 61, by increasing the pressure value PV up to the first pressure value PV1.

Furthermore, the user is able to cause a transition from the third display state ST3 to the first display state ST1, to display the first display image PD1 on the display panel 61, by increasing the pressure value PV up to the third pressure value PV3.

FIG. 20 is a flowchart showing an example of the display image determining process when changing the display image PD from the first display image PD1 to the second display image PD2. The process shown in FIG. 20 corresponds to a part of the "display image determining process" that is executed in Step S117 of FIG. 11. For convenience, in FIG. 20 the explanation is for a case wherein, after the beginning of the touch operation, the touch operation is continued until the pressure value PV arrives at the third pressure value PV3.

First, in Step S301, the display controlling unit 138 receives a user operation on the operating unit 50 and displays the first display image PD1 on the display panel 61.

Next, in Step S303, the display controlling unit 138 evaluates whether or not the touch sensor 63 of the display unit 60 has detected a touch operation from the user on the vehicle mark PM that is displayed in the first display image PD1.

Upon an evaluation by the display controlling unit 138 that no touch operation by the user on the vehicle mark PM has been detected (Step S303: NO), processing returns to Step S301.

Upon an evaluation by the display controlling unit 138 that a touch operation by the user on the vehicle mark PM has been detected (Step S303: YES), processing advances to Step S305.

Given this, in Step S305, the display controlling unit 138 acquires, from the touch sensor 63, the detection result for the pressure value PV through the touch operation.

Next, in Step S307, the display controlling unit 138 evaluates whether or not the pressure value PV is less than the second pressure value PV2.

Upon evaluation by the display controlling unit 138 that the pressure value PV is less than the second pressure value PV2 (Step S307: YES), processing advances to Step S309.

Given this, in Step S309, the display controlling unit 138 displays the overhead image PB and the vehicle image PR in the circle region AR11 in response to the pressure value PV. Thereafter, processing returns to Step S119, shown in FIG. 11.

Upon evaluation by the display controlling unit 138 that the pressure value PV is not less than the second pressure value PV2 (Step S307: NO), processing advances to Step S311.

Given this, in Step S311, the display controlling unit 138 evaluates whether or not the pressure value PV is the second pressure value PV2.

Upon evaluation by the display controlling unit 138 that the pressure value PV is the second pressure value PV2 (Step S311: YES), processing advances to Step S313.

Given this, in Step S313, the display controlling unit 138 displays the third display image PD3 in the display panel 61. Thereafter, processing returns to Step S119, shown in FIG. 11.

Upon evaluation by the display controlling unit 138 that the pressure value PV is not the second pressure value PV2 (Step S311: NO), processing advances to Step S315.

Given this, in Step S315, the display controlling unit 138 evaluates whether or not the pressure value PV is greater than the second pressure value PV2 and less than the first pressure value PV1.

Upon evaluation by the display controlling unit 138 that the pressure value PV is greater than the second pressure value PV2 and less than the first pressure value PV1 (Step S315: YES), processing advances to Step S317.

Given this, in Step S317, the display controlling unit 138 displays the second display image PD2 in a region depending on the pressure value PV. Note that the size of the region that depends on the pressure value PV is no greater than the size with which the first display image PD1 is displayed in Step S301. The region that depends on the pressure value PV is, for example, a square region. The square region is, for example, a region with a square shape that is similar to the square region wherein the first display image PD1 is displayed in Step S301. In this state, in the region wherein the first display image PD1 was displayed in Step S301, the second display image PD2 is displayed in the square region, and the first display image PD1 is displayed in the area outside of the square region. Thereafter, processing returns to Step S119, shown in FIG. 11.

Upon evaluation by the display controlling unit 138 that the pressure value PV is not greater than the second pressure value PV2 and less than the first pressure value PV1 (Step S315: NO), processing advances to Step S319.

Given this, in Step S319, the display controlling unit 138 evaluates whether or not the pressure value PV is at least equal to the first pressure value PV1 and less than the third pressure value PV3.

Upon evaluation by the display controlling unit 138 that the pressure value PV is at least equal to the first pressure value PV1 and less than the third pressure value PV3 (Step S319: YES), processing advances to Step S321.

Given this, in Step S321, the display controlling unit 138 displays the second display image PD2 in the display panel 61. Thereafter, processing returns to Step S119, shown in FIG. 11.

Upon evaluation by the display controlling unit 138 that the pressure value PV is not at least equal to the first pressure value PV1 and less than the third pressure value PV3 (Step S319: NO), processing advances to Step S323.

Given this, in Step S323, the display controlling unit 138 evaluates whether or not the pressure value PV is at least equal to the third pressure value PV3.

Upon evaluation by the display controlling unit 138 that the pressure value PV is at least equal to the third pressure value PV3 (Step S323: YES), processing advances to Step S325.

Given this, in Step S325, the display controlling unit 138 displays the second display image PD2 in the entire screen of the display panel 61. Thereafter, processing returns to Step S119, shown in FIG. 11.

Upon evaluation by the display controlling unit 138 that the pressure value PV is not at least equal to the third pressure value PV3 (Step S323: NO), processing returns to Step S119, shown in FIG. 11.

As explained in reference to FIG. 20, the display controlling unit 138 causes the image that is displayed in the display panel 61 to transition from the first display image PD1, via the third display image PD3, to the second display image PD2, based on the pressure value PV from the touch operation. Consequently, the user is able to display easily the third display image PD3 and the second display image PD2 through adjusting the pressure value PV.

As explained above, the vehicle surroundings information displaying system 100 comprises: a map image acquiring unit 132 for acquiring a map image PG of the surroundings of the vehicle 1; a first display image generating unit 135 for generating, and displaying on the display panel 61, a first display image PD1 by combining the map image PG and a vehicle mark PM that indicates the location of the vehicle 1; a surroundings information image generating unit 131 for generating a surroundings information image PS that shows surroundings information for the vehicle 1 based on point cloud data that indicate distances from a vehicle 1, acquired by a distance sensor 40; an overhead image acquiring unit 133 for acquiring an overhead image PB of the surroundings of the vehicle 1; a second display image generating unit 136 for generating, and displaying on the display panel 61, a second display image PD2, by combining the map image PG, the vehicle image PR that indicates the location of the vehicle 1, the overhead image PB, which is placed surrounding the vehicle image PR, and the surroundings information image PS, which is placed surrounding the overhead image PB; and a display controlling unit 138 for switching the image displayed on the display panel 61 between the first display image PD1 and the second display image PD2.

Consequently, because the image that is displayed on the display panel 61 is switched between the first display image PD1 and the second display image PD2 in response to an operation by the user, the user is able to switch, between the first display image PD1 and the second display image PD2, the image that is displayed on the first display panel 61.

Additionally, the first display image PD1 is generated by combining the map image PG and the vehicle mark PM that indicates the location of the vehicle 1. The first display image PD1 corresponds to what is termed a "navigation screen." Thus when the user wants to display the navigation screen, the user can display the first display image PD1.

Additionally, the second display image PD2 is generated by combining the map image PG, the vehicle image PR that indicates the location of the vehicle 1, the overhead image PB that is placed surrounding the vehicle image PR, and the surroundings information image PS that is placed surrounding the overhead image PB. Thus a surroundings information image PS of a range that is wider than that of the overhead image PB is included in the second display image PD2. Consequently, if there is danger of contact with another vehicle C or a pedestrian, the user can display the second display image PD2.

Additionally, a third display image generating unit 137 is provided for generating a third display image PD3, to be displayed on the display panel 61, through combining the map image PG, the vehicle image PR, and the overhead image PB, which is placed surrounding the vehicle image PR, where the display controlling unit 138 switches from the first display image PD1 to the second display image PD2 via the third display image PD3.

Thus the user is able to select the image to be displayed on the display panel 61 from among the first display image PD1, the second display image PD2, and the third display image PD3. This enables an improvement in convenience for the user.

Additionally, the third display image PD3 is generated through combining the map image PG, the vehicle image PR, and the overhead image PB that is provided surrounding the vehicle image PR. Consequently, the third display image PD3 can be displayed on the display panel 61 when the vehicle 1 is traveling at a low speed (specifically, when the vehicle 1 is attempting to park in a parking space, or the like).

Additionally, the display panel 61 is structured as a touch panel that is equipped with a touch sensor 63, where the operation referenced above is a touch operation on the vehicle mark PM or the vehicle image PR that is displayed on the touch panel, and the display controlling unit 138 switches between the first display image PD1 and the second display image PD2 in response to the pressure value PV detected by the touch sensor 63 depending on the touch operation.

Consequently, because the first display image PD1 and the second display image PD2 are switched depending on the pressure value PV detected by the touch sensor 63, depending on the touch operation, switching between the first display image PD1 and the second display image PD2 can be achieved easily.

Note that while in the present embodiment the explanation is for a case wherein the display controlling unit 138 switches between the first display image PD1 and the second display image PD2 depending on the pressure value PV, there is no limitation thereto. The display controlling unit 138 may switch between the first display image PD1 and the second display image PD2 in response to a touch time, which indicates the time over which there is a continuous touch operation. In this case it is not necessary for the touch sensor 63 to detect the pressure value PV, enabling the touch panel to be achieved through a simple structure.

Additionally, if a touch operation on the vehicle mark PM is received when in a state wherein the first display image PD1 is displayed, the display controlling unit 138 enlarges the region for displaying the second display image PD2 in accordance with the pressure value PV.

This enables the second display image PD2 to be displayed in a region of a part of the first display image PD1. This enables an improvement in convenience for the user. Additionally, because the region for displaying the second display image PD2 is enlarged in accordance with the pressure value PV, the user can display the second display image PD2 with the desired size.

Note that while the explanation in the present embodiment is for a case wherein the display controlling unit 138 enlarges the region for displaying the second display image PD2 in accordance with the pressure value PV, there is no limitation thereto. The display controlling unit 138 may instead enlarge the region for displaying the second display image PD2 in accordance with the touch time that indicates the time over which there is a continuous touch operation.

Additionally, the display controlling unit 138 displays a circumferential boundary line CF that indicates the region wherein the second display image PD2 is displayed.

This enables the user to discern that the second display image PD2 is displayed within the boundary line CF. This enables an improvement in convenience for the user.

Additionally, when, in a state wherein the pressure value PV is no less than the first pressure value PV1, there is a change to a state wherein no touch operation is detected, the display controlling unit 138 displays the second display image PD2 in the display panel 61, and if, in a state wherein the pressure value PV is less than the first pressure value PV1 and no less than a second pressure value PV2, which is less than the first pressure value PV1, there is a change to a state wherein no touch operation is detected, the display controlling unit 138 displays the third display image PD3 on the display panel 61.

Through this, the user is able to display the second display image PD2 on the display panel 61 through stopping the touch operation (that is, moving the finger away from the touch panel) when in a state wherein the pressure value PV is no less than the first pressure value PV1. Additionally, the user is able to display the third display image PD3 on the display panel 61 through stopping the touch operation (that is, moving the finger away from the touch panel) when in a state wherein the pressure value PV is less than the first pressure value PV1 and no less than the second pressure value PV2, which is less than the first pressure value PV1. Thus the second display image PD2 and the third display image PD3 can be displayed easily.

Note that while in the present embodiment the explanation was for a case wherein the display controlling unit 138 displayed the second display image PD2 or the third display image PD3 based on the pressure value PV prior to termination of the touch operation, there is no limitation thereto. The display controlling unit 138 may instead display the second display image PD2 or the third display image PD3 based on the touch time prior to termination of the touch operation. For example, if, in the state wherein the touch time is no less than a first time, there is a change to a state wherein no touch operation is detected, the display controlling unit 138 may display the second display image PD2 on the display panel 61, but if, in a state wherein the touch time is less than the first time and no less than a second time, which is less than the first time, there is a change to a state wherein no touch operation is detected, the display controlling unit 138 may display the third display image PD3 on the display panel 61.

Additionally, if, in a state wherein the second display image PD2 or the third display image PD3 is displayed on the display panel 61, a touch operation on the vehicle image PR is detected, the display controlling unit 138 switches the image that is displayed on the display panel 61 to be the first display image PD1.

Through this, the user can easily display the first display image PD1 on the display panel 61 from a state wherein the second display image PD2 or the third display image PD3 is displayed on the display panel 61. This enables an improvement in convenience for the user.

Additionally, the vehicle surroundings information displaying method according to the present embodiment includes: a map image acquiring step (Step S101 and Step S103) for acquiring a map image PG of the vicinity of the vehicle 1; a first display generating step (Step S113) for combining the map image PG and a vehicle mark PM that indicates the location of the vehicle 1 to generate a first display image PD1 that is to be displayed on the display panel 61; a surroundings information image generating step (Step S105 and Step S107) for generating a surroundings information image PS that shows surroundings information for the vehicle 1, based on point cloud data that indicate distances from the vehicle 1, acquired by a distance sensor 40; an overhead image acquiring step (Step S109 and Step S111) for acquiring an overhead image PB of the surroundings of the vehicle 1; a second display image generating step (Step S113) for combining the map image PG, a vehicle image PR, the overhead image PB, which is placed surrounding the vehicle image PR, and the surroundings information image PS, which is placed surrounding the overhead image PB, to generate a second display image PD2 that is to be displayed on the display panel 61; and a display controlling step (Step S117) for receiving an operation from a user, and in response to that operation, switching the image that is displayed on the display panel 61 between the first display image PD1 and the second display image PD2.

As a result, the vehicle surroundings information displaying method according to the present embodiment has the same effects as those of the vehicle surroundings information displaying system 100 according to the present embodiment.

The embodiment set forth above is no more than an illustration of one form of the present invention, and the present invention may be modified and applied appropriately in a range that does not deviate from the spirit and intent thereof.

For example, for ease in understanding the present invention, FIG. 1 is a diagram wherein the structural elements are shown partitioned into the main processing details, and the structural elements may be partitioned into more structural elements depending on the processing details. Moreover, the partitioning may be such that more processes are carried out by a single structural element.

Moreover, the processes in any of the structural elements may be executed in a single hardware or executed by a plurality of hardware.

Moreover, the processes of each structural element may be achieved by a single program, or by a plurality of programs.

Moreover, in FIG. 1 the vehicle surroundings information displaying system 100 may be provided integrally with the detecting unit 20 and/or the display unit 50.

Moreover, while in the present embodiment the vehicle surroundings information displaying system 100 was provided with a surroundings information image generating unit 131, a map image acquiring unit 132, an overhead image acquiring unit 133, a danger detecting unit 134, a first display image generating unit 135, a second display image generating unit 136, a third display image generating unit 137, and a display controlling unit 138, there is no limitation thereto. A server system that is connected with the vehicle surroundings information displaying system 100 so as to enable communications through a network, such as the Internet, may provide the surroundings information image generating unit 131, the map image acquiring unit 132, the overhead image acquiring unit 133, the danger detecting unit 134, the first display image generating unit 135, the second display image generating unit 136, the third display image generating unit 137, and/or the display controlling unit 138. The server system may provide, for example, the map image acquiring unit 132 and the overhead image acquiring unit 133. In this case, the overhead image acquiring unit 133 may acquire an overhead image PB that was imaged by an artificial satellite.

Moreover, in the present embodiment, as was explained in reference to FIG. 19, the explanation was for a case wherein the display controlling unit 138 transitions from a state wherein the first display image PD1 is displayed on the display panel 61 (that is, the first display state ST1) via a state wherein the third display image PD3 is displayed (that is, the third display state ST3) to a state wherein the second display image PD2 is displayed on the display panel 61 (that is, the fourth display state ST4); however, there is no limitation thereto.

The display controlling unit 138 may instead transition from a state wherein the first display image PD1 is displayed on the display panel 61 (that is, the first display state ST1) to a state wherein the second display image PD2 is displayed on the display panel 61 (that is, the fourth display state ST4) without passing through a state wherein the third display image PD3 is displayed (that is, the third display state ST3).

For example, the display controlling unit 138 may transition to a state wherein the second display image PD2 is displayed on the display panel 61 upon detection of a touch operation on the vehicle mark PM in a state wherein the first display image PD1 is displayed on the display panel 61. This enables a simplification in processing.

Moreover, in the present embodiment, as was explained in reference to FIG. 19, the explanation was for a case wherein the display controlling unit 138 transitions from a state wherein the second display image PD2 is displayed on the display panel 61 (that is, the fourth display state ST4) via a state wherein the third display image PD3 is displayed (that is, the third display state ST3) to a state wherein the first display image PD1 is displayed on the display panel 61 (that is, the first display state ST1); however, there is no limitation thereto.

The display controlling unit 138 may instead transition from a state wherein the second display image PD2 is displayed on the display panel 61 (that is, the fourth display state ST4) to a state wherein the first display image PD1 is displayed on the display panel 61 (that is, the first display state ST1) without passing through a state wherein the third display image PD3 is displayed (that is, the third display state ST3). For example, the display controlling unit 138 may transition to a state wherein the first display image PD1 is displayed on the display panel 61 upon detection of a touch operation on the vehicle image PR in a state wherein the second display image PD2 is displayed on the display panel 61. This enables a simplification in processing.

While in the present embodiment the explanation was for a case, as explained in reference to FIG. 19, wherein the display controlling unit 138 displayed the overhead image PB in a region depending on the pressure value PV when, in a state wherein the first display image PD1 is displayed in the display panel 61 (that is, in the first display state ST1), the pressure value PV is no more than a second pressure value PV2, there is no limitation thereto.

For example, the display controlling unit 138 may maintain the first display state ST1 when, in a state wherein the first display image PD1 is displayed in the display panel 61 (that is, in the first display state ST1), the pressure value PV is no more than the second pressure value PV2.

Moreover, the display controlling unit 138 may, for example, transition to a state wherein the third display image PD3 is displayed in the display panel 61 (that is, the third display state ST3), or to a state wherein the second display image PD2 is displayed in the display panel 61 (that is, the fourth display state ST4) if, when, in a state wherein the first display image PD1 is displayed in the display panel 61 (that is, in the first display state ST1), the pressure value PV is no more than the second pressure value PV2.

Moreover, while in the present embodiment, as explained in reference to FIG. 19, the explanation was for a case wherein the display controlling unit 138 transitioned to a state wherein the first display image PD1 is displayed in the display panel 61 (that is, the first display state ST1), passing sequentially through the third display state ST3 and the second display state ST2, when, in the state wherein the second display image PD2 is displayed in the display panel 61 (that is, the fourth display state ST4), the pressure value PV is increased, there is no limitation thereto.

For example, the display controlling unit 138 may transition to a state wherein the first display image PD1 is displayed in the display panel 61 (that is, the first display state ST1) if, in a state wherein the second display image PD2 is displayed in the display panel 61 (that is, the fourth display state ST4), the display controlling unit 138 detects a touch operation.

Moreover, when the vehicle surroundings information displaying method according to the present invention is achieved using a computer, the structure may be in the form of a recording medium whereon a control program to be executed by a computer is recorded, or a transmitting medium for transmitting the control program.

The recording medium may use a magnetic or optical recording medium, or a semiconductor memory device. Specifically, it may be a fixed recording medium or a portable recording medium such as a flexible disk, an HDD, a CD-ROM (Compact Disk Read-Only Memory), a DVD, a Blu-ray® disc, a magnetooptical disc, a flash memory, a card-type recording medium, or the like. Moreover, the recording medium may be a RAM, a ROM, or a non-volatile storage system, such as an HDD, provided by the vehicle surroundings information displaying system 100.

The control program may be downloaded by the vehicle surroundings information displaying system 100 from a server system to which the vehicle surroundings information displaying system 100 is connected so as to be able to communicate through a network.

Moreover, the processing units in the flowcharts shown in FIG. 11, FIG. 12, FIG. 13, and FIG. 20 are partitioned depending on the main processing units to facilitate easy understanding of the processes of the vehicle surroundings information displaying system 100, for example, but the present invention is not limited by the names and ways in which the processing units are divided. The processes of the vehicle surroundings information displaying system 100 may be divided into more processing units depending on the process details. Moreover, the processes of the vehicle surroundings information displaying system 100 may instead be divided so as to include more processes in a single processing unit.

EXPLANATION OF REFERENCE SYMBOLS

100: Vehicle Surroundings Information Displaying System
1: Vehicle
10: Location Detecting Unit
20: Detecting Unit
30: Imaging Unit
40: Distance Sensor (Sensor)
50: Operating Unit
60: Display Unit
61: Display Panel (Display)
130: Processor
131: Surroundings Information Image Generating Unit
132: Map Image Acquiring Unit
133: Overhead Image Acquiring Unit
134: Danger Detecting Unit
135: First Image Generating Unit
136: Second Image Generating Unit
137: Third Image Generating Unit
138: Display Controlling Unit
140: Memory
141: Map Storing Unit
142: Image Storing Unit
AR1: First Region
AR2: Second Region
CF: Boundary Line
MS: Moving Body
PM: Vehicle Mark
PR: Vehicle Image
PD1: First Display Image
PD2: Second Display Image
PD3: Third Display Image
PB: Overhead Image
PG: Map Image
PS: Surroundings Information Image
PV: Pressure Value
PV1: First Pressure Value
PV2: Second Pressure Value
PV3: Third Pressure Value

What is claimed is:

1. A vehicle surroundings information displaying system comprising: a processor that includes:
   a map image acquiring unit for acquiring a map image of the surroundings of a vehicle;
   a first display image generating unit for combining the map image and a vehicle mark that indicates the location of the vehicle, to generate a first display image to be displayed on a display;
   a surroundings information image generating unit for generating a surroundings information image that shows surroundings information for a vehicle, based on point cloud data that indicate distances from a vehicle, acquired by a sensor;
   an overhead image acquiring unit for acquiring an overhead image of the surroundings of the vehicle;
   a second display image generating unit for generating a second display image, to be displayed on the display panel, through combining the map image, the vehicle mark, the overhead image, which is placed surrounding the vehicle mark, and the surroundings information image, which is placed surrounding the overhead image; and
   a display controlling unit for receiving an operation from a user and, in response to the operation, switching the image that is displayed on the display between the first display image and the second display image, wherein
   the display is structured as a touch panel that comprises a touch sensor;
   the operation is a touch operation on the vehicle mark, which is displayed on the touch panel; and
   the display controlling unit switches between the first display image and the second display image in response to a pressure value detected by the touch sensor and/or a touch time, which indicates the time over which there is a continuous touch operation.

2. The vehicle surroundings information displaying system according to claim 1, further comprising:
   a third display image generating unit for combining the map image, the vehicle mark, and the overhead image, which is placed surrounding the vehicle mark, to generate a third display image to be displayed on the display, wherein:
   the display controlling unit switches from the first display image to the second display image through the third display image.

3. The vehicle surroundings information displaying system according to claim 1, wherein
   the display controlling unit enlarges a region wherein the second display image is displayed, in accordance with the pressure value or the touch time, upon receipt of a touch operation on the vehicle mark when in a state wherein the first display image is displayed.

4. The vehicle surroundings information displaying system according to claim 3, wherein the display controlling unit displays a circumferential boundary line indicating a region for displaying the second display image.

5. The vehicle surroundings information displaying system according to claim 1, wherein the display controlling unit:

displays the second display image in the display if, in a state wherein the pressure value is no less than a first pressure value or the touch time is no less than a first time, there is a change to a state wherein no touch operation is detected; and displays the third display image in the display if, in a state wherein the pressure value is less than the first pressure value and no less than a second pressure value that is less than the first pressure value, or in a state wherein the touch time is less than the first time and no less than a second time that is shorter than the first time, there is a change to a state wherein no touch operation is detected.

6. The vehicle surroundings information displaying system according to claim 1, wherein the display controlling unit switches the image that is displayed in the display to the first display image if, in a state wherein the second display image or the third display image is displayed in the display, a touch operation on the vehicle mark is detected.

7. A method of displaying vehicle surroundings information executed by a processor, comprising:

acquiring a map image of the surroundings of the vehicle;

combining the map image and a vehicle mark that indicates the location of the vehicle, to generate a first display image to be displayed on a display;

generating a surroundings information image that shows surroundings information for a vehicle, based on point cloud data that indicate distances from a vehicle, acquired by a sensor;

acquiring an overhead image of the surroundings of the vehicle; and generating a second display image, to be displayed on the display panel, through combining the map image, the vehicle mark, the overhead image, which is placed surrounding the vehicle mark, and the surroundings information image, which is placed surrounding the overhead image; and controlling a display by receiving an operation from a user and, in response to the operation, switching the image that is displayed on the display between the first display image and the second display image, wherein the display is structured as a touch panel that comprises a touch sensor;

the operation is a touch operation on the vehicle mark, which is displayed on the touch panel; and the step of controlling the display includes switching between the first display image and the second display image in response to a pressure value detected by the touch sensor and/or a touch time, which indicates the time over which there is a continuous touch operation.

* * * * *